United States Patent [19]

Keogh et al.

[11] 4,259,467
[45] Mar. 31, 1981

[54] HYDROPHILIC CONTACT LENS MADE FROM POLYSILOXANES CONTAINING HYDROPHILIC SIDECHAINS

[75] Inventors: Philip L. Keogh, Pittsford; Jay F. Kunzler, Canadaigua, both of N.Y.; Gregory C. C. Niu, Lexington, Mass.

[73] Assignee: Bausch & Lomb Incorporated, Rochester, N.Y.

[21] Appl. No.: 102,010

[22] Filed: Dec. 10, 1979

[51] Int. Cl.³ .............................................. C08F 30/08
[52] U.S. Cl. .................................... 526/279; 264/1.1; 528/12; 528/25; 528/31; 528/32; 204/159.13; 351/160 R; 351/160 H; 556/437
[58] Field of Search ............... 351/160 R, 160 H; 264/1.2; 204/159.13; 528/12, 25, 31, 32; 526/279; 556/437

[56] References Cited

U.S. PATENT DOCUMENTS

| | | | |
|---|---|---|---|
| Re. 25,727 | 2/1965 | Haluska | 260/448.2 |
| 2,762,823 | 9/1956 | Speier, Jr. | 260/448.2 |
| 2,770,631 | 11/1956 | Merker | 260/448.2 |
| 2,770,632 | 11/1956 | Merker | 260/448.2 |
| 2,819,245 | 1/1958 | Shorr | 260/42 |
| 2,823,195 | 2/1958 | Shorr et al. | 260/42 |
| 2,823,218 | 2/1958 | Speier et al. | 260/448.2 |
| 2,838,423 | 6/1958 | Gilkey | 427/387 |
| 2,838,515 | 6/1958 | Sommer | 260/290 |
| 2,842,517 | 7/1958 | Shorr | 525/445 |
| 2,855,381 | 10/1958 | Sommer | 528/37 |
| 2,894,967 | 7/1959 | Gilkey | 260/438.5 R |
| 2,924,587 | 2/1960 | Shore | 528/28 |
| 2,924,588 | 2/1960 | Speier | 528/40 |
| 2,925,402 | 2/1960 | Speier | 528/28 |
| 2,928,858 | 3/1960 | Morehouse | 556/419 |
| 2,929,829 | 3/1960 | Morehouse | 260/448.2 |
| 2,971,864 | 2/1961 | Speier | 528/38 |
| 2,989,559 | 6/1961 | Marsden | 260/448.2 |
| 3,032,577 | 5/1962 | Morehouse | 260/448.2 |
| 3,033,815 | 5/1962 | Pike et al. | 528/38 |
| 3,057,901 | 10/1962 | Plueddemann | 260/448.2 |
| 3,071,561 | 1/1963 | Bluestein | 528/33 |
| 3,152,161 | 10/1964 | Lisanke et al. | 260/448.2 |
| 3,215,643 | 11/1965 | Pail | 252/364 |
| 3,215,718 | 11/1965 | Ryan | 260/448.2 |
| 3,228,741 | 1/1966 | Becker | 351/160 |
| 3,246,048 | 4/1966 | Haluska | 528/27 |
| 3,249,586 | 5/1966 | Haluska | 528/41 |
| 3,317,460 | 5/1967 | Clark et al. | 260/448.2 |
| 3,317,577 | 5/1967 | Ryan | 260/448.2 |
| 3,328,449 | 6/1967 | Haluska | 260/448.2 |
| 3,338,943 | 8/1967 | Speier | 260/448.2 |
| 3,355,425 | 11/1967 | Haluska | 528/38 |
| 3,355,455 | 11/1967 | Haluska | 546/14 |
| 3,398,104 | 8/1968 | Haluska | 521/112 |
| 3,402,192 | 9/1968 | Haluska | 260/448.2 |
| 3,440,261 | 4/1969 | Saam | 260/448.2 |
| 3,458,553 | 7/1969 | Niederprüm et al. | 260/448.2 |
| 3,460,981 | 8/1969 | Keil et al. | 428/429 |
| 3,508,959 | 4/1970 | Krahnke | 427/2 |
| 3,512,915 | 5/1970 | Speier | 28/166 |
| 3,518,288 | 6/1970 | Haluska | 260/448.2 |
| 3,560,543 | 2/1971 | Plueddemann | 260/448.2 |
| 3,560,544 | 2/1971 | Haluska | 260/448.2 |
| 3,586,699 | 6/1971 | Wu | 260/326.5 A |
| 3,598,785 | 8/1971 | Holub et al. | 528/26 |
| 3,627,806 | 12/1971 | LeGrow | 260/448.2 |
| 3,658,867 | 4/1972 | Prokai | 260/448.2 |
| 3,660,452 | 5/1972 | Morehouse | 260/448.2 |
| 3,700,573 | 10/1972 | Laizier et al. | 204/159.13 |
| 3,700,713 | 10/1972 | Atherton et al. | 260/448.2 |
| 3,703,486 | 11/1972 | Keil | 521/110 |
| 3,716,518 | 2/1973 | Pittman | 528/41 |
| 3,729,444 | 4/1973 | Bey | 528/30 |
| 3,734,763 | 5/1973 | Plueddemann | 428/268 |
| 3,737,336 | 5/1973 | Golitz | 427/445 |
| 3,808,178 | 4/1974 | Gaylord | 526/279 |
| 3,836,559 | 9/1974 | Prokai | 260/448.2 |
| 3,843,529 | 10/1974 | Bertrand | 252/30 |
| 3,846,329 | 11/1974 | Householder et al. | 252/358 |
| 3,878,168 | 4/1975 | Schank | 525/474 |
| 3,884,860 | 5/1975 | Brown | 260/29.2 M |
| 3,916,033 | 10/1975 | Merrill | 427/36 |
| 3,993,606 | 11/1976 | von Bonin | 521/111 |
| 4,018,723 | 4/1977 | Kanner et al. | 521/107 |
| 4,049,674 | 9/1977 | Kanner | 260/332.1 |
| 4,049,675 | 9/1977 | Kanner | 260/332.1 |
| 4,049,676 | 9/1977 | Schilling, Jr. | 260/332.1 |
| 4,136,250 | 1/1979 | Mueller et al. | 528/29 |
| 4,138,382 | 2/1979 | Polmanteer | 260/29.6 TA |
| 4,153,641 | 5/1979 | Deichert et al. | 528/42 |
| 4,189,546 | 2/1980 | Deichert et al. | 526/26 |

FOREIGN PATENT DOCUMENTS 7704136 4/1977 Netherlands .

Primary Examiner—Melvyn I. Marquis
Attorney, Agent, or Firm—Robert M. Phipps; Frank C. Parker

[57] ABSTRACT

A hydrolytically stable, biologically inert, transparent, hydrophilic, contact lens comprising a polysiloxane containing hydrophilic sidechains is disclosed.

16 Claims, No Drawings

HYDROPHILIC CONTACT LENS MADE FROM POLYSILOXANES CONTAINING HYDROPHILIC SIDECHAINS duced to a formula similar to but yet critically different from the instant polyorganosiloxane monomers. From the pertinent teachings of U.S. Pat. No. 4,136,250 the following siloxane monomer may be derived:

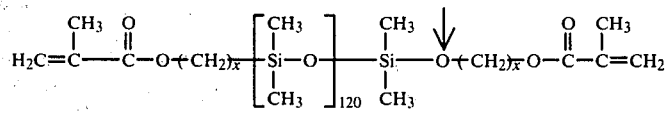

BACKGROUND OF THE INVENTION

1. Field of the Invention

This invention relates to a novel contact lens. These contact lenses are hydrolytically stable, biologically inert, transparent and hydrophilic. The contact lens are prepared from the polymerization of polysiloxane monomers containing hydrophilic sidechains which form polymers in a crosslinked network. The polymers and/or copolymers are hydrophilic, optically clear and colorless. The polymers and copolymers described herein can be usually employed for making "hard" or "soft" contact lenses, intraocular implants, as well as other prostheses, more particularly "soft" contact lenses which are hydrophilic.

2. Prior Art Statement

U.S. Pat. No. 4,153,641 teaches contact lenses made from polymers and copolymers comprising poly(organosiloxane) polymers and copolymers formed by polymerizing a poly(organosiloxane) monomer $\alpha,\omega$ terminally bonded through divalent hydrocarbon groups to polymerized, free radical polymerizably activated, unsaturated groups forming a polymer in a crosslinked network. Additionally, specific comonomers are disclosed which include lower esters of acrylic and methacrylic acid, styryls and N-vinyl pyrrolidinone which may be copolymerized with the above described poly(organosiloxane) monomer to form a copolymer. The instant invention preferred polysiloxane monomers include the same poly(organosiloxane) monomers described above. However, it was unexpectedly discovered that when siloxane monomers one of the preferred embodiments of which is described above, have attached thereto hydrophilic sidechains, then the polysiloxanes become hydrophilic. The polymers are then extremely suitable for making hydrophilic, soft contact lenses. It is generally known in the siloxane art that siloxanes are hydrophobic. There are a few instances where the art teaches hydrophilic polysiloxanes.

U.S. Pat. No. 4,136,250 teaches, in pertinent part, a water absorbing polysiloxane which may be used to make soft contact lenses which is obtaind by copolymerizing the following siloxane monomer:

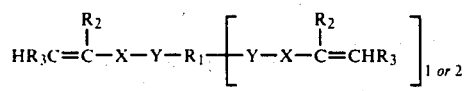

in which $R_1$ can be

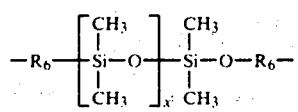

with a variety of hydrophilic monomers including acrylic acid. The above siloxane monomers can be reduced to a formula similar to but yet critically different from the instant polyorganosiloxane monomers. From the pertinent teachings of U.S. Pat. No. 4,136,250 the following siloxane monomer may be derived:

The oxygen atom in the monomer backbone with the arrow pointing to it is present in the '250 formula but not present in the instant polyorganosiloxane monomers. This oxygen atom presents several problems. This particular oxygen atom, because of its placement between the silicone and carbon atoms, is subject to hydrolysis and alcoholysis. Furthermore, the material disclosed in '250 is unstable at room temperature when in water. This stability is important, if this material is to be used for biomedical devices, such as contact lenses, since these types of devices come in constant contact with water and are also usually heated in water in order to disinfect them. If, during heating, the contact lens loses its shape, then it loses its optics. This means that the material taught in '250 would be undesirable for use in certain medical devices including contact lenses. The instant polyorganosiloxane monomers result in copolymers which have superior hydrolytic stability since there is no Si-O-C linkage.

Also to be considered are the examples of '250. Only in these examples of '250 are there specific monomers disclosed without this undesirable Si-O-C linkage. HOwever, these specific monomers have undesirable urethane linkages or couplings which present structures which are even more different from the instant monomers. The urethane linkage, i.e.,

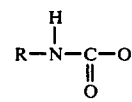

is as mentioned, also undesirable for use in medical devices, particularly contact lenses. However, in addition, the instant polyorganosiloxane monomers have no urethane linkages.

U.S. Pat. No. 4,138,382 teaches, in pertinent part, a hydrophilic, water swellable, crosslinked copolymer gel. This copolymer is a hydrogel, such as N-vinylpyrrolidone crosslinked with a low molecular weight siloxane. The siloxane component is a very small constituent and is present for the purpose of crosslinking. The siloxane is not present in amounts more than about 2 percent by weight. This does not teach a hydrophilic siloxane, much less a contact lens made therefrom.

Dutch Pat. No. 7,704,136 published Oct. 18, 1977 teaches, in pertinent part, a wettable siloxane material for use in making contact lenses. The Dutch patent refers to some of the monomers which may be reacted with the polysiloxanes taught in '136 which are esters of glycidyl alcohol and esters of certain acids including acrylic acid and methacrylic acid. '136 also suggests the use of specific anhydrides such as maleic anhydride. This Dutch reference '136 does not disclose the instant polysiloxanes.

U.S. Pat. No. 3,808,178 discloses, in pertinent part, a polymeric material containing a polymethacrylate backbone with relatively short poly(organosiloxane) ester sidechains on the backbone polymer. There is no crosslinking involved in '178 since the monomers disclosed in '178 are monofunctional, i.e., have only one functional group on each monomer. In order to get crosslinking in '178 it is taught at column 5 of '178 that different monomers must be added for crosslinking which have more than one functionality. Not only does '178 not teach the polysiloxane monomers used in the instant invention but '178 does not teach making the instant hydrophilic siloxane for use as hydrophilic contact lens.

U.S. Pat. No. 3,228,741 teaches, in pertinent part, a silicone contact lens in general. However, nowhere are any sidechains disclosed. Neither does '741 teach a hydrophilic siloxane contact lens as in the instant invention.

U.S. Pat. No. 3,700,573 teaches, in pertinent part, radiation grafting of hydrophilic polymers to polysiloxanes. These siloxanes are then used in making contact lens. One skilled in the art would be taught that something must be done to polysiloxanes in order to make then hydrophilic. As taught in '573, silicones are inherently hydrophobic. In '573 the surface is treated in order to make this material hydrophilic. Surface treatment is not as effective as the instant invention for making a siloxane hydrophilic. Surface treatment only affects the surface on the contact lens. This surface can be removed, for example, by abrasion. However, in the instant invention the hydrophilic siloxane material is hydrophilic throughout.

U.S. Pat. No. 3,249,586 teaches, in pertinent part, a siloxane monomer with a cyclic amide sidechain. In '586 this monomeric material is prepared by hydrosilation. The siloxane monomeric material of '586 can be polymerized and used as thermoplastic, elastomeric and resinous material. Nowhere does '586 teach that the final material is hydrophilic or that it can be used to make contact lens.

U.S. Pat. No. 3,317,460 teaches, in pertinent part, a polyalcohol sidechain siloxane monomer, '460 teaches making copolymers with di- and trifunctional siloxane monomers. These monomeric materials are useful as curing agents for isocyanate prepolymers, for preparing polyurethane rubbers and for making varnishes. This reference does not remotely teach contact lens, much less, hydrophilic siloxane contact lens as in the instant invention.

U.S. Pat. No. 3,703,486 teaches, in pertinent part, a siloxane monomer which contains a sidechain which has a solubilizing group attached. The solubilizing group may be either COOH, carboxylic acid, carboxylic acid ester, amide, amine, cyano, thio, hydrocarbon or a ketone. This monomeric material is ploymerized and used as a polymer for foam. In the instant invention, the group sidechains tend to increase the solubilizing factors. '486 is using solubilizing sidechains but for a completely different reason. '486 is using a completely different type of system than in the instant invention.

U.S. Pat. No. 3,729,444 teaches, in perteient part, a carboxylic acid sidechain siloxane monomer, copolymerized with difunctional siloxanes. This material is used to enhance paper's resistance to wetting. '444 does not remotely teach or suggest making, contact lenses, much less, hydrophilic siloxane contact lenses.

U.S. Pat. No. 3,586,699 teaches, in pertinent part, an imido sidechain siloxane monomer. This imido group is a nitrogen which has two carbonyl groups attached to it. In '699, it is taught that a cyclic siloxane compound containing one of these sidechains can be polymerized to form a high molecular weight polymer. This material is cured to form an elastomer. Nowhere does '699 remotely teach or suggest making contact lenses, much less, hydrophilic siloxane contact lenses.

U.S. Pat. No. 3,716,518 teaches, in pertinent part, diethylene glycol allyl methyldisiloxane sidechain siloxane monomer. This is one of the preferred monomers used in the instant invention. The sidechain is attached by hydrosilation. This monomeric material is not polymerized so no shaped bodies are formed as in the instant invention where hydrophilic contact lens are formed from siloxane material which is surprisingly hydrophilic.

U.S. Pat. No. 3,916,033 teaches, in pertinent part, grafting, by the use of radiation, hydrophilic polymers onto polymethyl siloxane in order to make it hydrophilic. This material is then used to make contact lens. More specifically, '033 teaches using polydimethysiloxane and radiation grafting onto the surface of this materal. This is a completely different process than taught in the instant invention.

U.S. Pat. No. Re. 25,727 teaches, in pertinent part, an ether sidechain siloxane monomer which is made by hydrosilation. The ether sidechain silicone monomer is used as a surfactant. The siloxane monomer is endcapped with trimethylsilo groups. This same monomer is polymerized in the instant invention to form hydrophilic contact lens. However '727 does not polymerize the monomeric material disclosed therein to form shaped bodies, much less, hydrophilic siloxane contact lenses, since the material disclosed in '727 is for use as a surfactant and one does not polymerize a surfactant into a solid material is used as a surfactant.

U.S. Pat. No. 2,723,987 teaches, in pertinent part, a carboxylate, i.e., a carboxylic acid sidechain siloxane monomer. The carboxylic sidechains are reacted with ether an alcohol or an amine to make a polyamide or polyester. This is an intermediate material. It is taught in '987 that these intermediates, i.e., monomers, are particularly useful in the preparation of siloxane modified alkyd resins. '987 does not teach that the material, i.e., either the ester sidechain siloxane monomers can be cured to form shaped bodies. Also, in '987 the curing is done through the carboxylate groups by combining this with the polyalcohol or polyamine. This type of curing is not done in the instant invention.

U.S. Pat. No. 2,762,823, in pertinent part, teaches an amino sidechain siloxane monomer. '823 describes the preparation of amino sidechain siloxane monomers. These amino sidechain siloxane monomers are not cured to form shaped bodies. Also, the amino functionality is used to react with polyacids to form polyamide type resins. These monomeric materials disclosed in '823 are cured through the amine groups by reacting with a diacid chloride, etc. This type of reaction is not used in the instant invention. In '823 the sidechain siloxane monomers are intermediates used to form further end products not relevant to the instant invention.

U.S. Pat. No. 2,770,631 teaches, in pertinent part, hydroxy ester substituted siloxane monomers. '631 teaches that a carboxyl group can be attached to the silicone via a $CH_2$ radical. '631 does not teach any sidechains longer than a $CH_2$. However, the instant invention also utilizes short sidechains. However, the longer sidechains would be more hydrolitically stable. It is known that hydroxy groups and ester groups that are alpha to silicone are much more stable compounds than the beta substituted siloxanes. Also, '631 does teach an ester that has a hydroxy group in the sidechains. However, these monomers are used in '631 as lubricants, sunscreen agents and these monomers, it is taught in '631, are soluble in silicone fluids which make them valuable as antioxidants and stabilizers for greases, etc. However, nowhere does '631 teach that the hydroxy ester sidechain siloxane monomers are cured to form shaped bodies, much less hydrophilic siloxane contact lenses. '631 would not want a polymerized material since these materials, i.e., monomers, are used in lubricants and should remain fluid. However, as mentioned, '631 does prepare an hydroxy ester sidechain siloxane monomer, a vinyl sidechain siloxane monomer, a phenyl sidechain siloxane monomer but, as mentioned, '631 does not cure these monomers into shaped bodies, much less polymerize these monomers to form hydrophilic siloxane contact lens.

U.S. Pat. No. 2,770,632 teaches, in pertinent part, an ester acid sidechain siloxane monomer. The only length of the alkyl attaching the ester to the silicone is a $CH_2$ group. '632 does not teach longer sidechains. However, these short sidechains are used on the monomers taught in the instant invention. Most importantly, however, these monomers are used in '632 as lubricants, sunscreens, emulsifying agents, etc. Also, '632 makes the metal salts of the carboxylic acid which are utilized in the instant invention as monomeric material but '632 uses this monomeric material simply as an emulsifying agent. In '632 these monomers should not be polymerized due to the end uses taught in '632.

U.S. Pat. No. 3,458,553 teaches, in pertinent part, a paraffinsiloxane monomer which contains either an amide or a cyano sidechain. '553 teaches the instant monomeric intermediates used herein. However, nowhere does '553 teach or suggest the instant hydrophilic siloxane polymeric materials or contact lens made therefrom.

U.S. Pat. No. 2,819,245 teaches, in pertinent part, hydroxy sidechain siloxane monomers, amino sidechain siloxane monomers, carboxylic acid sidechain siloxane monomers, amide amino sidechain siloxane monomers, amide amino carboxylate sidechain siloxane monomers, all of which are utilized as monomeric material in the instant invention. However, '245 does not teach that these monomeric materials can be cured since these materials are used to react with epoxides. '245 uses the functionality present to react with an epoxy resin which is then cured. This reaction is irrelevant to the instant invention. Furthermore, '245 does not remotely teach contact lens or shaped bodies.

U.S. Pat. No. 2,823,195 teaches, in pertinent part, reacting a carboxylic acid sidechain siloxane monomer with a diamine to form a polyamide. The siloxane monomer is being used as an intermediate. The siloxane, as mentioned, is reacted with a diamino or a triamino compound to make a polyamide. This reaction is not used in the instant invention. Neither does '197 teach a shaped boyd, much less a contact lens.

U.S. Pat. No. 2,838,423 teaches, in pertinent part, an amide sidechain siloxane monomer which is then reacted with formaldehyde and pyridine to make a pyridinium salt. This monomer is utilized in the instant invention. However, in '423 the material is used as a water repellent for fabrics. The salt sidechain siloxane monomer is used in '423 in a relatively low percentage in order to make the siloxane adhere to the fabric. '423 is actually teaching using the polar sidechain as a binding agent for the fabric since '423 is making the fabric hydrophobic rather than hydrophilic. Therefor, '423 is using a salt for hydrophobic purposes. The instant invention is using this sidechain siloxane monomer in order to make the polymerized crosslinked siloxane contact lens hydrophilic.

U.S. Pat. No. 2,838,515 teaches, in pertinent part, a pyridine end-capped siloxane monomer. However, '515 does not teach attaching a hydrophilic sidechain to this monomer. Therefore, '515 teaches one of the backbones used in the instant invention without the sidechains. '515 teaches that these materials are useful as solvents and as lubricants.

U.S. Pat. No. 2,842,517 teaches, in pertinent part, an alcohol sidechain siloxane monomer or a carboxylic acid sidechain siloxane monomer. These may be reacted with an unsaturated diacid to make polyester resins. '517 does teach some of the siloxane monomers utilized in the instant invention. However, '517 uses a carboxylic group or the alcohol group as a curing functionality. This reaction is not utilized in the instant invention. Furthermore, '517 does not make shaped bodies with the siloxane per se, but reacts these siloxanes with other materials, not uitlized in the instant invention, in order to make shaped bodies. Therefore, the end product is not the instant materials nor are the shaped bodies, contact lens, much less, hydrophilic siloxane contact lens as in the instant invention.

U.S. Pat. No. 2,855,381 teaches, in pertinent part, amide sidechain siloxanes monomers. '381 cures these siloxanes monomers to form rubber. '381 incorporates the amide sidechains into the siloxane monomers to make the silicone rubber more resistant to attack by hydrocarbon solvents and oils. '381 cures these siloxanes with benzoyl peroxides which is one of the preferred types of cures used in the instant invention. However, '381 is only teaching how to make the silicone rubbers more resistant to oils. '381 does not teach that this makes the silicone rubber hydrophilic. Neither does '381 teach hydrophilic contact lenses.

U.S. Pat. No. 2,894,967 teaches, in pertinent part, carboxylates and alcohol sidechain siloxane monomers. '967 teaches using these monomers as chromium complexing agents. These materials are not used to form shaped bodies, much less, hydrophilic siloxane contact lenses.

U.S. Pat. No. 2,924,587, U.S. Pat. No. 2,924,588 and U.S. Pat. No. 2,925,402 teach, in pertinent part, either alcohol sidechain siloxane monomers or carboxyl sidechain siloxane monomers, both of which are utilized in the instant invention as monomeric material. However, nowhere do these references teach hydrophilic contact lenses, much less, hydrophilic siloxane contact lenses. In '402 the material is cured with diacids, diisocyanates, diols, diamines, etc. These reactions are not used in the instant invention. '588 teaches alcohol sidechain siloxane monomers. '588 teaches that functional siloxane monomers can be used to react with polyfunctional organic compounds such as dicarboxylic acids or diisocyanates to give a resinous material. '588 does not teach that one can take these monomeric materials per se and cure them into useful bodies. These monomeric materials must be reacted with other materials in order to form U.S. Pat. No. 2,989,559 teaches, in pertinent part, a ketone sidechain siloxane monomer. '559 does not remotely teach or suggest making contact lenses.

U.S. Pat. No. 3,032,577 teaches, in pertinent part, an amino sidechain siloxane monomer which has an hydroxy alkyl ester attached to the amino group. '577 does not remotely teach or suggest making contact lenses.

U.S. Pat. No. 3,071,561 teaches, in pertinent part, a pyridine sidechain siloxane monomer. '561 does not remotely teach or suggest making contact lenses.

U.S. Pat. No. 3,152,161 teaches, in pertinent part, a diamino siloxane monomer. '161 teaches that one of the amino groups has a hydroxy alkyl group attached. '161 does not remotely teach or suggest making contact lenses.

U.S. Pat. No. 3,598,785 teaches, in pertinent part, an amide endcapped siloxane monomer which may be one of the backbones of the monomers used in the instant invention. However, '785 does not remotely teach contact lenses, much less, the instant hydrophilic siloxane contact lenses.

U.S. Pat. No. 3,658,867 teaches, in pertinent part, a quaternary ammonium sidechain siloxane monomer. '867 does not remotely teach or suggest making contact lenses.

U.S. Pat. No. 3,660,452 teaches, in pertinent part, an amino sulfate salt sidechain siloxane monomer. '452 does not remotely teach or suggest making contact lenses.

U.S. Pat. No. 3,737,336 teaches, in pertinent part, an amino sidechain siloxane monomer. In '336 it is taught that this amino endcapped siloxane monomer can be used as a hydrophobic coating. The instant invention uses this monomeric material to make crosslinked polymeric hydrophilic siloxane contact lenses. '336 does not remotely teach or suggest making contact lenses.

U.S. Pat. No. 3,836,559 teaches, in pertinent part, quaternary ammonium sidechain siloxane monomers. '559 does not remotely teach or suggest making contact lenses.

U.S. Pat. No. 3,878,168 teaches, in pertinent part, amide, sulfonamide and urea sidechain siloxane monomers. '168 does not remotely teach or suggest making contact lenses.

U.S. Pat. No. 4,018,723 teaches, in pertinent part, morpholino modified polyether sidechain polysiloxane monomers. '723 teaches that two different kinds of sidechains can be used. '723 uses a polyether to obtain certain foam properties and then uses a poly urethane sidechain. Then the morpholine group, which has an oxygen and nitrogen in a 6-membered ring, is used to give a material used a a fire retardant. Also, these monomeric materials are being used in '723 as surfactants. Nowhere does '723 remotely teach or suggest making contact lenses.

U.S. Pat. No. 4,049,674, U.S. Pat. No. 4,049,675 and U.S. Pat. No. 4,049,676 teach, in pertinent part, sulfolanyl siloxane monomers made by hydrosilation. These monomeric materials are used as surfactants and as fire retardants. Nowhere does either '674, '675 or '676 remotely teach or suggest making contact lenses.

U.S. Pat. No. 3,249,586 teaches, in pertinent part, cyclic amide sidechain siloxane monomers made by hydrosilation. '586 does not remotely teach or suggest making contact lenses.

U.S. Pat. No. 3,993,606 teaches, in pertinent part, carboxylate salt of an amino siloxane monomer. This material is an amino endcapped siloxane monomer. '606 does not remotely teach or suggest making contact lenses.

U.S. Pat. No. 2,838,423 teaches, in pertinent part, an amide sidechain siloxane monomer. To the amide group is attached methlpyridine salt. '423 does not remotely teach or suggest making contact lenses.

U.S. Pat. No. 3,700,713 teaches, in pertinent part, an ether amide sidechain siloxane monomer made by hydrosilation. '713 does not remotely teach or suggest making contact lenses.

SUMMARY OF THE INVENTION

The polysiloxanes containing hydrophilic sidechains of the instant invention can be used to prepare contact lenses. However, the polymers and copolymers can also be employed for other uses, such as, shaped articles for use in biomedical applications.

The contact lens of the instant invention comprise a polysiloxane monomer having the following formula:

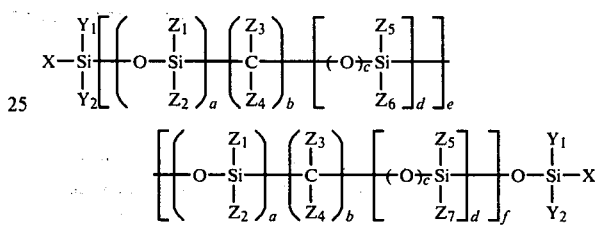

wherein
$Y_1$ and $Y_2$ equal the same or different and are selected from the group consisting of a monovalent hydrocarbon having from 1 to 20 carbon atoms and a halogenated monovalent hydrocarbon having from 1 to 20 carbon atoms, X is selected from the group consisting of a hydroxyl radical, a monovalent hydrocarbon having from 1 to 20 carbon atoms, halogenated monovalent hydrocarbon having from 1 to 20 carbon atoms,

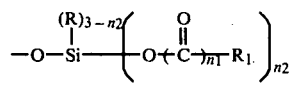

wherein R is a monovalent hydrocarbon having from 1 to 20 carbon atoms, $R_1$ is a monovalent hydrocarbon having from 1 to 20 carbon atoms, $n_1$ is an integer from zero to 1 and $n_2$ is an integer from 1 to 3,

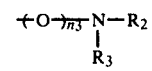

wherein $R_2$ and $R_3$ are the same or different and are monovalent hydrocarbons having from 1 to 20 carbon atoms and $n_3$ is an integear from zero to 1, $-R_4-A$ wherein $R_4$ is a divalent hydrocarbon having from 1 to about 22 carbon atoms and A is a free radical polymerizably activated monovalent unsaturated group, a is at least 1, b is zero or at least 2, c is 1 if b is zero and c is zero if b is at least 2, d is at least 1, except when b is zero and a is 1 then d is zero or greater, e is at least 1 and f is zero or greater, $Z_1$ through $Z_7$ are the same or different and at least one of $Z_1$ through $Z_7$ is equal to a hydrophilic sidechain, said $Z_1$ through $Z_7$ are selected from the group consisting of a monovalent hydrocarbon having from 1 to 20 carbon atoms, a halogenated monovalent hydrocarbon having from 1 to 20 carbon atoms and a hydrophilic sidechain, polymerized to form a polymer in a crosslinked network.

When there are more than one $Z_1$ on the backbone of the polymer, all of these $Z_1$'s maybe the same or different. Also, this applies to $Z_2$ through $Z_7$. For example, the following formula is illustrative of this:

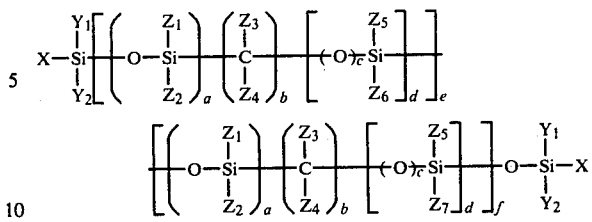

wherein $Y_1$ and $Y_2$ equal the same or different and are selected from the group consisting of a monovalent hydrocarbon having from 1 to 20 carbon atoms and a

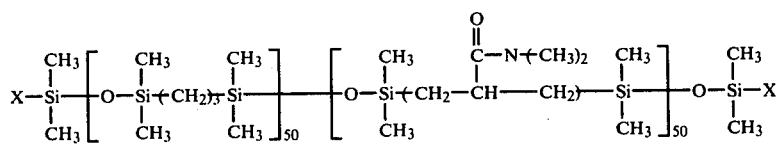

In order to easily locate the Z's, compare the above formula with the broad general formula disclosed herein. In the above formula $Z_1$, $Z_2$, $Z_5$, $Z_6$ and $Z_7$ equal —$CH_3$, all the $Z_4$'s equal hydrogen and there are 250 $Z_3$'s equal to hydrogen and 50 $Z_3$'s equal to

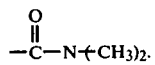

The monomeric polysiloxane containing the hydrophilic sidechain groups may be polymerized by several techniques, e.g., condensation, hydrosilation and free radical polymerization, all of which are taught in H. S. Kaufman and J. J. Falcetta, Introduction To Polymer Science and Technology, Chapter 2, pp. 25–108, Wiley-Interscience Publication 1977.

As is well established, the oxygen transportability of polysiloxanes is substantially greater in comparison to conventional contact lens polymers, such as, polymethyl methacrylate (PMMA) or polyhydroxyethylmethacrylate (PHEMA). No only is the oxygen transportability of the instant material much higher than the conventional contact lens polymer, but the instant material is also hydrophilic. A high percent of siloxane units in the instant formula results in a product more capable of transporting oxygen as compared with a lower percentage of siloxane units. However, it has been discovered that by the use of hydrophilic sidechains attached to these polysiloxanes that a polymer or copolymer may be obtained which is not only oxygen permeable but is hydrophilic. The instant polymers appear in the formulas to be blocked copolymers. However, it is believed the instant polymers are random copolysiloxanes.

DESCRIPTION OF PREFERRED EMBODIMENTS

In accordance with one embodiment of this invention, contact lens may be fabricated which are hydrolytically stable, biologically inert, transparent and hydrophilic. These contact lens comprise a polysiloxane monomer having the following formula:

halogenated monovalent hydrocarbon having from 1 to 20 carbon atoms,

X is selected from the group consisting of a hydroxyl radical, a monovalent hydrocarbon having from 1 to 20 carbon atoms, halogenated monovalent hydrocarbon having from 1 to 20 carbon atoms,

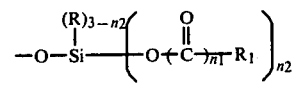

wherein R is a monovalent hydrocarbon having from 1 to 20 carbon atoms, $R_1$ is a monovalent hydrocarbon having from 1 to 20 carbon atoms, $n_1$ is an integer from zero to 1 and $n_2$ is an integer from 1 to 3,

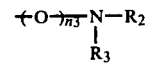

wherein $R_2$ and $R_3$ are the same or different and are monovalent hydrocarbons having from 1 to 20 carbon atoms and $n_3$ is an integer from zero to 1,

wherein $R_4$ is a divalent hydrocarbon having from 1 to about 22 carbon atoms and A is a free radical polymerizably activated monovalent unsaturated group, a is at least 1, b is zero or at least 2, c is 1 if b is zero and c is zero if b is at least 2, is at least 1 except where b is zero and a is 1 then d is zero or greater, e is at least 1 and f is zero or greater, $Z_1$ through $Z_7$ are the same or different and at least one of $Z_1$ through $Z_7$ is equal to a hydrophilic sidechain, said $Z_1$ through $Z_7$ are selected from the group consisting of a monovalent hydrocarbon having from 1 to 20 carbon atoms, a halogenated monovalent hydrocarbon having from 1 to 20 carbon atoms and a hydrophilic sidechain with the following formula selected from the group consisting of

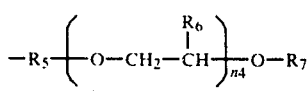 (1)

wherein $R_5$ is a divalent hydrocarbon having from 1 to 10 carbon atoms, $R_6$ is selected from the group consisting of methyl and hydrogen, $R_7$ is selected from the group consisting of hydrogen, a monovalent hydrocarbon having from 1 to 10 carbon atoms,

wherein $R_8$ is selected from the group consisting of a monovalent hydrocarbon having from 1 to 10 carbon atoms and hydrogen, and $n_4$ is at least 1,

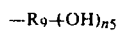 (2)

wherein $R_9$ is a hydrocarbon having from 1 to 20 carbon atoms and a valence of $n_5+1$, $n_5$ is at least 1 and there cannot be an —OH group on an aliphatic carbon atom beta to the Si atom, and no carbon atom of $R_9$ can have more than one —OH group attached thereto

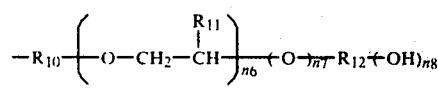 (3)

wherein $R_{10}$ is a divalent hydrocarbon having from 1 to 10 carbon atoms, $R_{11}$ is selected from the group consisting of hydrogen and methyl and $R_{12}$ is a hydrocarbon having from 2 to 20 carbon atoms and a valence of $n_8+1$ and can have no more than one oxygen atom attached to any one carbon atom, $n_6$ is zero or greater, $n_7$ is an integer from zero to 1 and $n_8$ is at least 1,

 (4)

wherein $R_{13}$ is a divalent hydrocarbon having from 2 to 10 carbon atoms and the

 group is not attached to a carbon atom of $R_{13}$ which is alpha to the Si atoms, $R_{14}$ and $R_{15}$ can be the same or different and are selected from the group consisting of a monovalent hydrocarbon having from 1 to 10 carbon atoms, hydrogen, $-(CH_2-CH_2)_{\overline{n_9}}OH$ wherein $n_9$ is an integer from 1 to 3 and

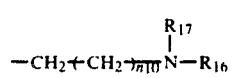

wherein $R_{16}$ and $R_{17}$ are the same or different and are selected from the group consisting of hydrogen and a monovalent hydrocarbon having from 1 to 10 carbon atoms and $n_{10}$ is an integer from 1 to 5,

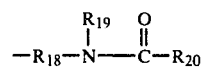 (5)

wherein $R_{18}$ is a divalent hydrocarbon having from 1 to 20 carbon atoms and $R_{19}$ and $R_{20}$ are the same or different and are selected from the group consisting of hydrogen and a monovalent hydrocarbon having from 1 to 10 carbon atoms,

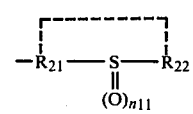 (6)

wherein $R_{21}$ is a divalent or trivalent hydrocarbon having from 1 to 10 carbon atoms and S is not attached to $R_{21}$ by an aliphatic carbon atom beta to the Si atoms, $R_{21}$ may or may not be attached to $R_{22}$ to form a ring which contains more than 3 carbon atoms and $R_{22}$ is selected from the group consisting of a hydrocarbon having from 1 to 10 carbon atoms and $-O^{\ominus}M^{\oplus}$ where M is selected from the group consisting of a monovalent metal ion and a quaternary ammonium ion, and $n_{11}$ is an integer from 1 to 2,

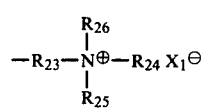 (7)

wherein $R_{23}$ is a divalent hydrocarbon having from 3 to 10 carbon atoms and the $N^{\oplus}$ must be attached to a carbon atom of $R_{23}$ which is at least 2 carbon atoms away from the Si atom, $R_{24}$, $R_{25}$ and $R_{26}$ are the same or different and are monovalent hydrocarbons having from 1 to 10 carbon atoms, $X_1^{\ominus}$ is a monovalent anion selected from the group consisting of halides, $R_{27}$—COO$^{\ominus}$ wherein $R_{27}$ is selected from the group consisting of hydrogen, a monovalent hydrocarbon having from 1 to 10 carbon atoms and a halogenated monovalent hydrocarbon having from 1 to 10 carbon atoms and $R_{28}$—SO$_3^{\ominus}$ wherein $R_{28}$ is selected from the group consisting of a monovalent hydrocarbon having from 1 to 10 carbon atoms and a halogenated monovalent hydrocarbon having from 1 to 10 carbon atoms,

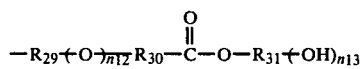 (8)

wherein $R_{29}$ is a divalent hydrocarbon having from 1 to 10 carbon atoms and $n_{12}$ is an integer from 0 to 1 and when $n_{12}$ is 1 the oxygen cannot be attached to an aliphatic carbon atom in $R_{29}$ which is beta to the Si atom, $R_{30}$ is a divalent hydrocarbon having from 1 to 10 carbon atoms, $R_{31}$ is a hydrocarbon having from 2 to 20 carbon atoms and a valence of $n_{13}+1$ and can have no more than 1 oxygen atom attached to any one carbon atom and $n_{13}$ is at least 1,

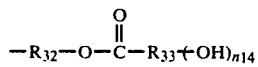 (9)

wherein $R_{32}$ is a divalent hydrocarbon having from 1 to 10 carbon atoms and the oxygen atom bonded to $R_{32}$ cannot be attached to an aliphatic carbon atom in $R_{32}$ which is beta to the Si atom, $R_{33}$ is a hydrocarbon having from 2 to 20 carbon atoms and a valence of $n_{14}+1$ and can have no more than 1 oxygen atom attached to any one carbon atom and $n_{14}$ is an integer of at least 1,

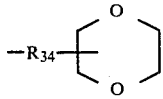 (10)

wherein $R_{34}$ is a divalent hydrocarbon having from 1 to 10 carbon atoms,

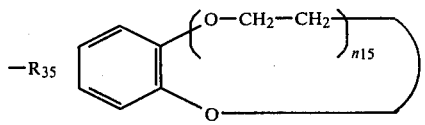 (11)

wherein $R_{35}$ is a divalent hydrocarbon having from 2 to 10 carbon atoms and $n_{15}$ is an integer from 1 to 10,

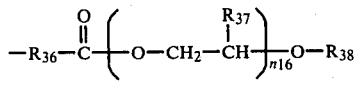 (12)

wherein $R_{36}$ is a divalent hydrocarbon having from 2 to 10 carbon atoms and the carbonyl group is not attached to a carbon atom alpha to the Si atom, $R_{37}$ is selected from the group consisting of methyl and hydrogen, $R_{38}$ is selected from the group consisting of hydrogen, a monovalent hydrocarbon having from 1 to 10 carbon atoms and

wherein $R_{39}$ is a monovalent hydrocarbon having from 1 to 10 carbon atoms and $n_{16}$ is at least 1,

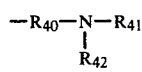 (13)

wherein $R_{40}$ is a divalent hydrocarbon having from 1 to 10 carbon atoms, $R_{41}$ and $R_{42}$ can be the same or different and are selected from the group consisting of monovalent hydrocarbons having from 1 to 10 carbon atoms and $-(CH_2)_{n_{17}}OH$ where $n_{17}$ is an integer from 2 to 4,

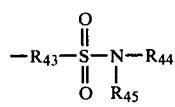 (14)

wherein $R_{43}$ is a divalent hydrocarbon having from 1 to 10 carbon atoms and the S atom cannot be attached to a carbon atom of $R_{43}$ which is alpha to the Si atom, $R_{44}$ and $R_{45}$ can be the same or different and are selected from the group consisting of hydrogen and a monovalent hydrocarbon having from 1 to 10 carbon atoms,

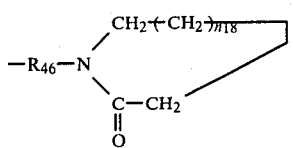 (15)

wherein $R_{46}$ is a divalent hydrocarbon having from 1 to 10 carbon atoms and $n_{18}$ is an integer from zero to 3,

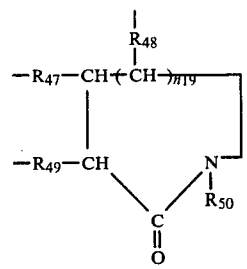 (16)

wherein $R_{47}$ and $R_{48}$ are selected from the group consisting of hydrogen, divalent or monovalent hydrocarbon having from 0 to 10 carbon atoms and $R_{49}$ is selected from the group consisting of hydrogen, divalent or monovalent hydrocarbon having from 1 to 10 carbon atoms and only one of $R_{47}$, $R_{48}$ and $R_{49}$ must be a divalent hydrocarbon and attached to the Si atom, $R_{50}$ is selected from the group consisting of hydrogen, a monovalent hydrocarbon having from 1 to 10 carbon atoms and $-(CH_2)_{n_{20}}OH$ where $n_{20}$ is 2 to 4, and $n_{19}$ is an interger from zero to 3,

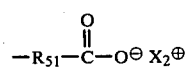 (17)

wherein $R_{51}$ is a divalent hydrocarbon having from 2 to 10 carbon atoms and the carbonyl group cannot be attached to a carbon atom of $R_{51}$ alpha to the Si atom and $X_2^+$ is a monovalent cation selected from the group consisting of monovalent metal cations and

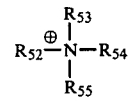

wherein $R_{52}$, $R_{53}$, $R_{54}$ and $R_{55}$ can be the same or different and selected from the group consisting of hydrogen and a monovalent hydrocarbon having from 1 to 10 carbon atoms, and

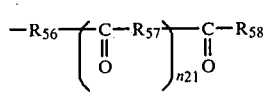 (18)

wherein $R_{56}$ is a divalent hydrocarbon having from 1 to 10 carbon atoms and the carbonyl group cannot be attached to a carbon atom of $R_{56}$ which is alpha to the Si atom, $R_{57}$ is a divalent hydrocarbon having from one to 10 carbon atoms, $R_{58}$ is selected from the group consisting of hydrogen and a monovalent hydrocarbon having from 1 to 10 carbon atoms and $n_{21}$ is an integer from zero to 10, polymerized to form a polymer in a crosslinked network.

Preferably, the hydrophilic sidechains are one of

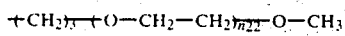

wherein $n_{22}$ is an integer from 2 to 3,

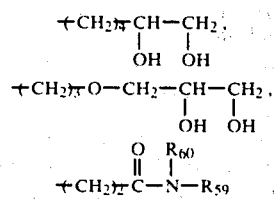

wherein $R_{59}$ and $R_{60}$ are the same or different and are selected from the group consisting of hydrogen, methyl and $-CH_2-CH_2-OH$,

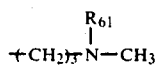

wherein $R_{61}$ is selected from the group consisting of hydrogen and methyl,

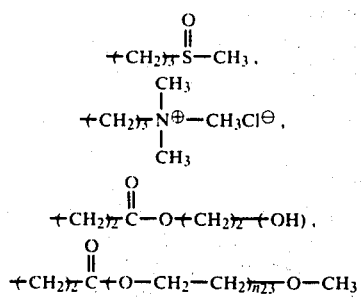

wherein $n_{23}$ is an integer from 2 to 3

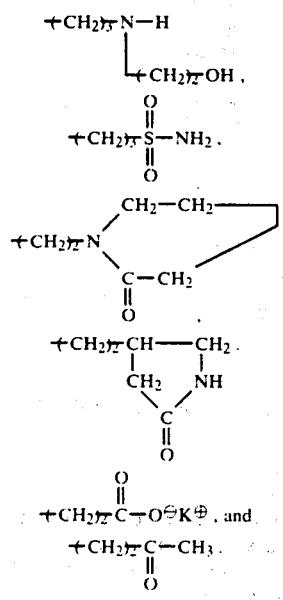

In a preferred embodiment of the instant invention, when the siloxane backbone is a poly (organo) siloxane the following is preferred.

Preferably, X is one of

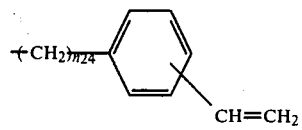

wherein $n_{24}$ is an integer from 0 to 2, $-CH=CH_2$ and $-(R_{62})-G$ wherein $R_{62}$ is $-(CH_2)_{n_{25}}$ wherein $n_{25}$ is an integer from 3 to 4 and G is

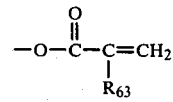

wherein $R_{63}$ is selected from the group consisting of hydrogen and methyl.

More preferably X is

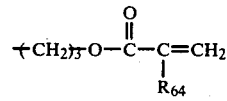

wherein $R_{64}$ is selected from the group consisting of hydrogen and methyl, most preferably $R_{64}$ is methyl.

Preferably $Y_1$ is methyl and $Y_2$ is phenyl. More preferably $Y_1$ and $Y_2$ are methyls.

Preferably only one of $Z_1$, $Z_2$, $Z_5$ and $Z_6$ is a hydrophilic sidechain and a is equal to 1 to about 1,000, b is equal to zero, c is equal to 1, d is equal to 1 to about 1,000, e is equal to one and f is equal to zero. The instant contact lens may be hard or soft.

More preferably only one of $Z_1$, $Z_2$, $Z_5$ and $Z_6$ is a hydrophilic sidechain and a is equal to 10 to about 500, b is equal to zero, c is equal to one, d is equal to about 10 to about 500, e is equal to one and f is equal to zero. The instant contact lens may be hard or soft.

Even more preferably when only one of $Z_1$, $Z_2$, $Z_5$ and $Z_6$ is a hydrophilic sidechain and a is equal to about 75 to about 150, b is equal to zero, c is equal to one, d is equal to about 25 to about 50, e is equal to one and f is equal to zero, the instant contact lens is soft and flexible.

Most preferably when only one of $Z_1$, $Z_2$, $Z_5$ and $Z_6$ is a hydrophilic sidechain and a is equal to about 75, b is equal to zero, c is equal to one, d is equal to 25, e is equal to one and f is equal to zero, the instant contact lens is soft and flexible.

Most preferably $Z_1$, $Z_2$ and $Z_5$ are methyls and most preferably $Z_6$ is one of $-(CH_2)_3(O-CH_2-CH_2)_{\overline{n_{26}}}O-CH_3$ wherein $n_{26}$ is an integer from 2 to 3,

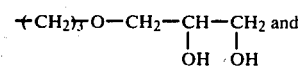

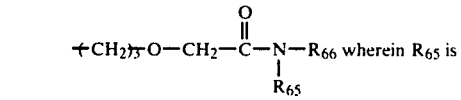

selected from the group consisting of methyl and hydrogen, $R_{66}$ is selected from the group consisting of methyl, hydrogen and —$CH_2$—$CH_2$—OH.

In another preferred embodiment of the instant invention, when the siloxane backbone is a polyparaffinsiloxane, the following is preferred. When only one of $Z_1$ through $Z_7$ is a hydrophilic sidechain and a may be equal to one, b is equal to about 2 to 4, c is equal to zero, d is equal to one, e is equal to about 25 to 500 and f is equal to 5 to 500, the contact lens may be either hard or soft.

More preferably in this embodiment, only one of $Z_1$ through $Z_7$ is a hydrophilic sidechain and a is equal to one, b is equal to about 2 to about 3, c is equal to zero, d is equal to one, e is equal to 25 to about 250 and f is equal to about 10 to about 250, resulting in a soft and flexible contact lens.

In this embodiment, even more preferably one one of $Z_1$ through $Z_7$ is a hydrophilic sidechain and a is equal to one, b is equal to about 2 to about 3, d is equal to one, c is equal to zero, e is equal to from about 50 to about 100 and f is equal to from about 10 to about 100, resulting in a soft and flexible contact lens.

In this same embodiment, most preferably only one of $Z_1$ through $Z_7$ is a hydrophilic sidechain and a is equal to one, b is equal to from about 2 to about 3, c is equal to zero, d is equal to one, e is equal to from about 50 to about 75 and f is equal to from about 10 to 75, resulting in a soft and flexible contact lens.

In this same embodiment, most preferably $Z_1$, $Z_2$, $Z_5$, $Z_6$, $Z_7$, $Y_1$ and $Y_2$ are equal to methyl and $Z_4$ is equal to hydrogen and at least one of $Z_3$'s in the methylene bridge is equal

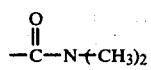

and the other $Z_3$'s in that bridge equal hydrogen, and X equals

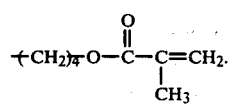

When there are more than one $Z_1$ on the backbone of the polymer, all of these $Z_1$'s maybe the same or different. Also, this applies to $Z_2$ through $Z_7$. For example, the following formula is illustrative of this:

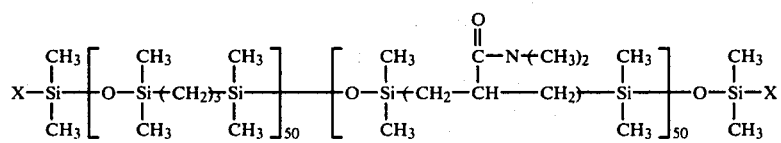

In order to easily locate the Z's, compare the above formula with the broad general formula disclosed herein. In the above formula $Z_1$, $Z_2$, $Z_5$, $Z_6$ and $Z_7$ equal —$CH_3$, all the $Z_4$'s equal hydrogen and there are 250 $Z_3$'s equal to hydrogen and 50 $Z_3$'s equal to

When X is a polymerizable group then the instant polysiloxane monomers may be compolymerized with comonomers, such as, hydroxyethylmethacrylate (HEMA), methacrylates and acrylates, e.g., cyclohexylacrylate, methyl methacrylate, benzyl methacrylate, ethylene glycol dimethacrylate and glycerine trimethacrylate, monoesters of acrylic or methacrylic acid and an alcohol having an esterifiable hydroxy group and at least one additional hydroxy group, such as, 2-hydroxy ethyl methacrylate and 2,3-dihydroxy propyl acrylate, acrylamide and methacrylamides, N-vinyl lactams, acrylonitrile and methacrylonitrile, derivatives of methacrylic acid, acrylic acid, itaconic acid and crotonic acid, styryls, such as, styrene, divinyl benzene, vinylethyl benzene, vinyltoluene and allylic monomers, such as, diallyl diglycol dicarbonate, allylcyanide, allyl chloride, diallyl phthalate, allyl bromide, diallyl furmarate and diallyl carbonate and comonomers.

The following are hydrophilic sidechains which are preferred.

POLYETHERS

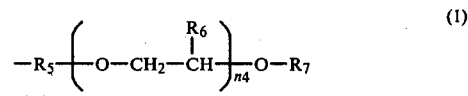
(1)

wherein $R_5$ is a divalent hydrocarbon having from 1 to 10 carbon atoms, $R_6$ is selected from the group consisting of methyl and hydrogen, $R_7$ is selected from the group consisting of hydrogen, a monovalent hydrocarbon having from 1 to 10 carbon atoms,

wherein $R_8$ is selected from the group consisting of a monovalent hydrocarbon having from 1 to 10 carbon atoms and hydrogen and $n_4$ is at least 1.

The most preferred polyethers are 4,7,10-trioxaundecane

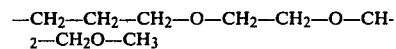

and 4,7,10,13-tetraoxatetradecane

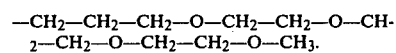

POLYALCOHOLS

(2)

wherein $R_9$ is a hydrocarbon having from 1 to 20 carbon atoms and a valence of $n+1$, $n_5$ is at least 1 and there cannot be an —OH group on an aliphatic carbon atom beta to the Si atom,

POLYETHER-POLYALCOHOL

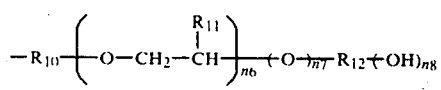  (3)

wherein $R_{10}$ is a divalent hydrocarbon having from 1 to 10 carbon atoms, $R_{11}$ is selected from the group consisting of hydrogen and methyl and $R_{12}$ is a hydrocarbon having from 1 to 20 carbon atoms and a valence of $n_6+1$ and can have no more than 1 oxygen atom attached to any one carbon atom, $n_6$ is zero or greater, $n_7$ is an integer from zero to 1 and $n_8$ is at least 1.

The most preferred polyalcohols are 4 oxa-6,7-dihydroxy heptane

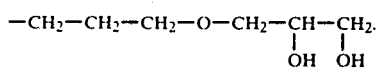

AMIDE AND AMIDE-ALCOHOL

  (4)

wherein $R_{13}$ is a divalent hydrocarbon having from 2 to 10 carbon atoms and the

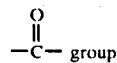 group is not attached to a carbon atom of $R_{13}$ which is alpha to the Si atom, $R_{14}$ and $R_{15}$ can be the same or different and are selected from the group consisting of a monovalent hydrocarbon having from 1 to 10 carbon atoms, hydrogen, $CH_2\!\!-\!\!(CH_2)_{\overline{n9}}\,OH$ wherein $n_9$ is an integer from 1 to 3 and

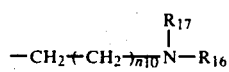

wherein $R_{16}$ and $R_{17}$ are the same or different and are selected from the group consisting of hydrogen and a monovalent hydrocarbon having from 1 to 10 carbon atoms and $n_{10}$ is an integer from 1 to 5,

AMIDE

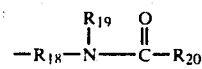  (5)

wherein $R_{18}$ is a divalent hydrocarbon having from 1 to 20 carbon atoms and $R_{19}$ and $R_{20}$ are the same or different and are selected from the group consisting of hydrogen and a hydrocarbon having from 1 to 10 carbon atoms,

SULPHONE AND SULPHOXIDE

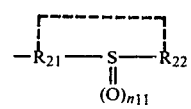  (6)

wherein $R_{21}$ is a divalent or trivalent hydrocarbon having from 1 to 10 carbon atoms and the S atom is not attached to $R_{21}$ by an aliphatic carbon atom beta to the Si atom, $R_{21}$ may or may not be attached to $R_{22}$ to form a ring which contains more than 3 carbon atoms and is selected from the group consisting of a hydrocarbon having from 1 to 10 carbon atoms and $O^-M^+$ where M is selected from the group consisting of a monovalent metal ion and a quaternary ammonium ion, and $n_{11}$ is an integer from 1 to 2,

QUATERNARY SALTS

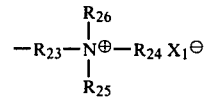  (7)

wherein $R_{23}$ is a divalent hydrocarbon having from 3 to 10 carbon atoms and the $N^\oplus$ must be attached to a carbon atom of $R_{23}$ which is at least 2 carbon atoms away from the Si atoms, $R_{24}$, $R_{25}$ and $R_{26}$ are the same or different and are monovalent hydrocarbons having from 1 to 10 carbon atoms, $X_1^\ominus$ is a monovalent anion selected from the group consisting of halides, $R_{27}\!\!-\!\!COO^\ominus$ wherein $R_{27}$ is selected from the 10 carbon atoms and a halogenated monovalent hydrocarbon having from 1 to 10 carbon atoms and $-R_{28}-SO_3^\ominus$ wherein $R_{28}$ is selected from the group consisting of a monovalent hydrocarbon having from 1 to 10 carbon atoms and a halogenated monovalent hydrocarbon having from 1 to 10 carbon atoms,

HYDROXY ESTERS

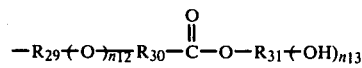  (8)

wherein $R_{29}$ is a divalent hydrocarbon having from 1 to 10 carbon atoms and $n_{12}$ is an integer from 0 to 1 and when $n_{12}$ is 1 the oxygen cannot be attached to an aliphatic carbon atom in $R_{29}$ which is beta to the Si atom, $R_{30}$ is a divalent hydrocarbon having from 1 to 10 carbon atoms, $R_{31}$ is a hydrocarbon having from 1 to 20 carbon atoms and a valence of $n_{13}+1$ and can have no more than 1 oxygen atom attached to any one carbon atom, and $n_{13}$ is at least 1,

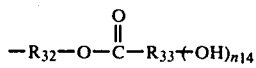  (9)

wherein $R_{32}$ is a divalent hydrocarbon having from 1 to 10 carbon atoms and the ester oxygen cannot be attached to an aliphatic carbon atom in $R_{32}$ which is beta to the Si atom, $R_{33}$ is a hydrocarbon having from 1 to 20 carbon atoms and a valence of $n_{14}+1$ and can have no more than 1 oxygen atom attached to any one carbon atom and $n_{14}$ is at least 1,

CYCLIC ESTERS

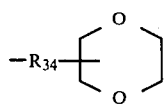 (10)

wherein $R_{34}$ is a divalent hydrocarbon having from 1 to 10 carbon atoms,

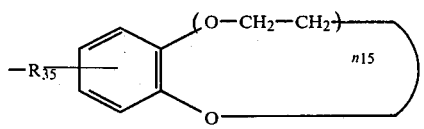 (11)

wherein $R_{35}$ is a divalent hydrocarbon having from 2 to 10 carbon atoms and $n_{15}$ is an integer from 1 to 10,

ESTER-ETHERS

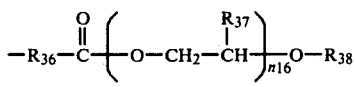 (12)

wherein $R_{36}$ is a divalent hydrocarbon having from 2 to 10 carbon atoms and the carbonyl group is not attached to a carbon atom alpha to the Si atom, $R_{37}$ is selected from the group consisting of methyl and hydrogen, $R_{38}$ is selected from the group consisting of hydrogen, a monovalent hydrocarbon having from 1 to 10 carbon atoms and

wherein $R_{39}$ is a monovalent hydrocarbon having from 1 to 10 carbon atoms and $n_{16}$ is at least 1,

AMINES

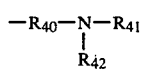 (13)

wherein $R_{40}$ is a divalent hydrocarbon having from 1 to 10 carbon atoms, $R_{41}$ and $R_{42}$ can be the same or different and are selected from the group consisting of monovalent hydrocarbons having from 1 to 10 carbon atoms and $-(CH_2)_{\overline{n17}}OH$ where $n_{17}$ is 2 to 4,

SULPHONAMIDES

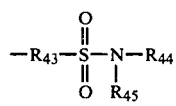 (14)

wherein $R_{43}$ is a divalent hydrocarbon having from 1 to 10 carbon atoms and the S cannot be attached to a carbon atom of $R_{43}$ which is alpha to the Si atoms, $R_{44}$ and $R_{45}$ can be the same or different and are selected from the group consisting of hydrogen and a monovalent hydrocarbon having from 1 to 10 carbon atoms,

CYCLIC AMIDES

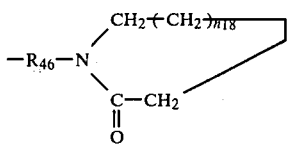 (15)

wherein $R_{46}$ is a divalent hydrocarbon having from 1 to 10 carbon atoms and $n_{18}$ is an integer from zero to 3,

CYCLIC AMIDES

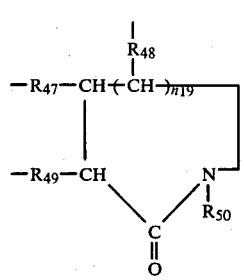 (16)

wherein $n_{19}$ is an integer from zero to 3, $R_{47}$ and $R_{48}$ are selected from the group consisting of hydrogen, divalent or monovalent hydrocarbon having from 0 to 10 carbon atoms and $R_{49}$ is selected from the group consisting of hydrogen, divalent or monovalent hydrocarbon having from 1 to 10 carbon atoms and one of $R_{47}$, $R_{48}$ and $R_{49}$ must be a divalent hydrocarbon and attached to the Si atom, $R_{50}$ is selected from the group consisting of a monovalent hydrocarbon having from 1 to 10 carbon atoms and $-(CH_2)_{\overline{n20}}OH$ wherein $n_{20}$ is an integer from 2 to 4,

CARBOLYLATE SALTS

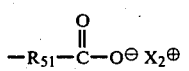 (17)

wherein $R_{51}$ is a divalent hydrocarbon having from 2 to 10 carbon atoms and the carbonyl group cannot be attached to a carbon atom of $R_{51}$ alpha to the Si atoms and $X_2^{\oplus}$ is a monovalent cation selected from the group consisting of monovalent metal cations and

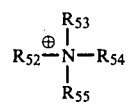

wherein $R_{52}$, $R_{53}$, $R_{54}$ and $R_{55}$ are the same or different and selected from the group consisting of hydrogen and a monovalent hydrocarbon having from 1 to 10 carbon atoms, and

KETONES AND ALDEHYDES

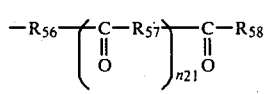 (18)

wherein $R_{56}$ is a divalent hydrocarbon having from 2 to 10 carbon atoms and the carbonyl group cannot be attached to a carbon atom of $R_{56}$ which is alpha to the Si atom, $R_{57}$ is a divalent hydrocarbon having from one to 10 carbon atoms, $R_{58}$ is selected from the group consisting of hydrogen and a monovalent hydrocarbon having from 1 to 10 carbon atoms and $n_{21}$ is an integer from zero to 10.

When the term "soft" is used herein to describe the contact lens of the instant invention, it is meant that the material should have a softness preferably of about 60 or below on the Shore hardness A scale. Most preferably the Shore hardness should be 25 to 35 on the A scale.

When the term "hydrolytically stable" is used herein it is meant that when the contact lens or biomedical device disclosed herein when placed into an aqueous solution, e.g., in the eye, or during the disinfecting step, i.e., water plus heat, the lens or device will not change in chemical composition, i.e., hydrolyze, which would cause a lens to change shape resulting in an undesirable change in optics or shape.

When the term "biologically inert" is used here in it is meant that the contact lens or biomedical device disclosed herein have phsiochemical properties rendering them suitable for prolonged contact with living tissue, blood or the mucous membranes such as would be required for biomedical shaped articles. It also means that this material is antithrombogenic and nonhemolytic to blood which is necessary for prosthesis and devices sued with blood. These materials disclosed herein are compatible with living tissue.

When the term "oxygen transportability" or "oxygen transporting" or "that the contact lens has the capability of transporting oxygen sufficiently to meet the requirements of the human cornea" and used herein, it is meant that the instant material will allow sufficient transmission of oxygen through itself to supply the necessary oxygen requirements of the human cornea. The oxygen requirements of the human cornea are about $2 \times 10^{-6} cm^3/(sec.cm^2 atm.)$ as reported by Hill and Fatt, *American Journal of Optometry and Archives of the American Academy of Optometry*, vol. 47, pg. 50, 1970.

When the term "flexible" is used herein, it is meant that the contact lens is capable of being folded or bent back upon itself without breaking.

When the term "resilient" is used herein, it is meant that after the lens has been deformed the lens will return quickly to its original shape.

The most preferred contact lens, i.e., polymers, of the instant invention are soft, hydrophilic, flexible, hydrolytically stable, biologically inert and have an oxygen transport rate of at least about $2 \times 10^{-6} cm^3/(sec.cm^2 atm.)$. These lens have a softness preferably of about 60 or below on the Shore hardness A scale. Most preferably, the Shore hardness should be 25 to 35 on the A scale.

To further illustrate the most preferred contact lens of the instant invention's physical properties, the tensile modulus of elasticity should be about 500 g/mm² or less. If the material is to be used as contact lens, then the Shore hardness and modulus may be related to the comfort of the lens to the wearer when used on the human eye.

There are commercially available, both hydrophobic and hydrophilic contact lenses. The hydrophobic contact lenses available are primarily hard contact lenses made from such materials as (PMMA) polymethyl methacrylate. However, there are soft contact lenses available which are hydrophilic. These lenses are usually made from polymers and copolymers based on (HEMA) hydroxyethylmethacrylate. However, neither of these materials made from PMMA or PHEMA are oxygen permeable enough to meet all the oxygen requirements of the human cornea. Therefore, a material had to be developed which was soft, for comfort, and also, oxygen permeable, to the extent that when the material was made into a contact lens, sufficient oxygen would pass through the material to meet all the requirements of the human cornea. It was found that polysiloxane materials are oxygen permeable to the extent that oxygen will pass through these materials when made into contact lenses sufficiently to meet the requirements of the human cornea. Also, contact lenses made from polysiloxanes are soft, resulting in more comfort for the wearer. Therefore, it was found that polysiloxane materials could be a good candidate for making soft contact lenses. However, it was found that when soft contact lenses were made from known polysiloxane materials, these lenses did not ride on the cornea of the eye on a layer of tears but rather attach themselves to the cornea in a manner which altered the metabolic outflow and inflow of fluid from the eye. It is known that non-movement or substantially non-movement of soft contact lenses on the eye can result in physical damage to the cornea. As mentioned, it has been noted that when a soft contact lens moves on the eye there is also an exchange of tear fluid under the lens resulting in the exchange of metabolic products supplying the cornea and metabolic byproducts being removed from the cornea. This movement of tear fluid results in maintaining a healthy environment for the cornea. This has been generally reported by Roth and Iwasaki, *Complications Caused by Silicone Elastomer Lenses in West Germany and Japan*, paper presented at the Second Contact Lens Conference, February 18, 1979, in Tokyo, Japan (Prof. Motoichi Itoi, M.D., Kyoto, Prefectural University of Medicine, Hirokohji, Kawara Machi-Dohri, KamikyoKu, Kyoto 602); Kreiner, Christine F., Neues Optikerjournal, No. 2 (21) February 10, 1979; VonArens, Franz D., Neues Optikerjournal, No. 3 (21) March 10, 1979; and VonZimmermann, E., Neues Optikerjournal, No. 4, (21) April 10, 1979.

The instant contact lens moves on the eye sufficiently so that no physical damage occurs to the cornea and sufficient tear exchange occurs so that the cornea metabolism proceeds normally. Therefore, the instant polymers make excellent material for manufacturing contact lens and, as mentioned, do not stick to the eye but move sufficiently during normal wear so that corneal metabolism will proceed normally.

When the term "moveable soft contact lens" is used herein, it is meant that when the lens is placed on the eye during normal wear the lens will move at least 0.5 mm with each blink of the eyelid. Preferably, the lens should move from about 0.5 mm to about 1.0 mm with each blink.

Further, when the term "moveable soft contact lens" is used herein, it is meant that the lens moves sufficiently on the eye so that (1) no physical damage occurs to the cornea and (2) sufficient tear fluid exchange occurs under the lens so that sufficient cornea metabolic activity is maintained resulting in a healthy environment for the cornea.

When the term "non-moveable soft contact lens" is used herein, it is meant that the lens will move less than about 0.5 mm with each blink of the eyelid.

When the term "hydrophilic soft contact lens" is used herein, it is meant that the soft contact lens surface will not repel water as opposed to the "hydrophobic" lens where the lens would tend to repel water.

The following illustrates a preferred embodiment of the instant invention:

This is a representative general formula. The actual product is a random copolysiloxane.

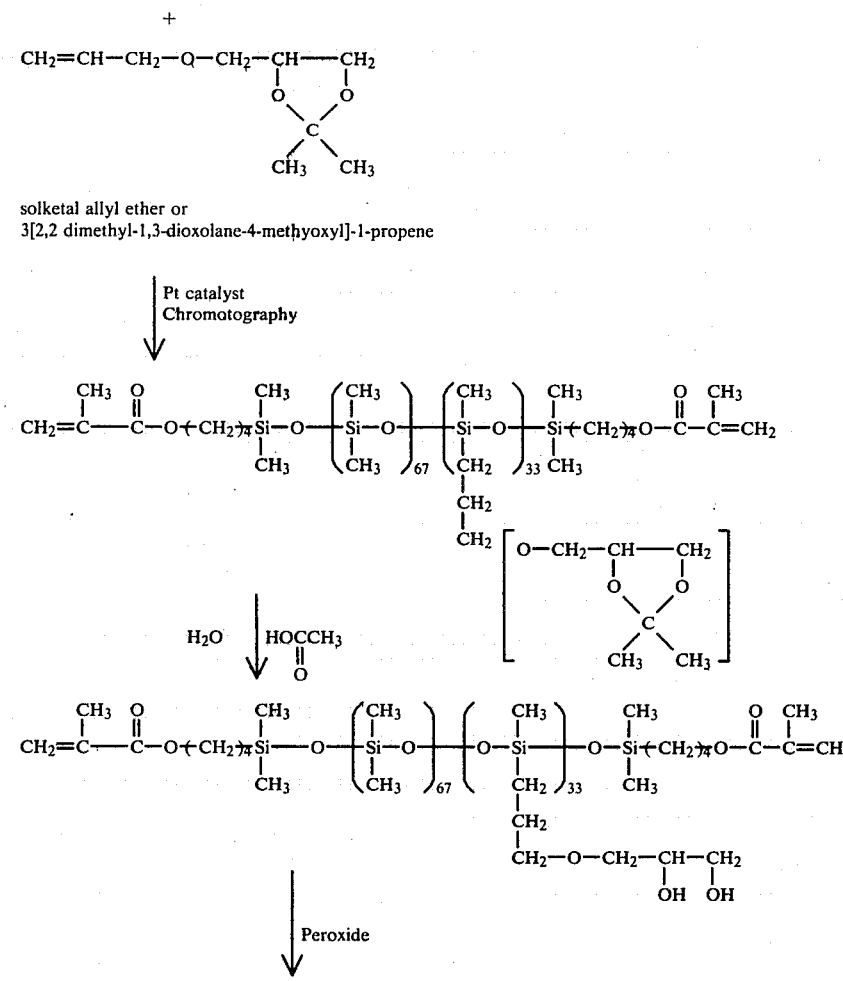

Cured polymer or shaped body as product. The product formed after standing in H₂O was completely wettable and has absorbed 13 percent H₂O by weight based on the total weight of the material plus water. This is 33 mole percent 6,7-dihydroxy-3-oxyheptane hydrophilic sidechain methacrylate endcapped siloxane.

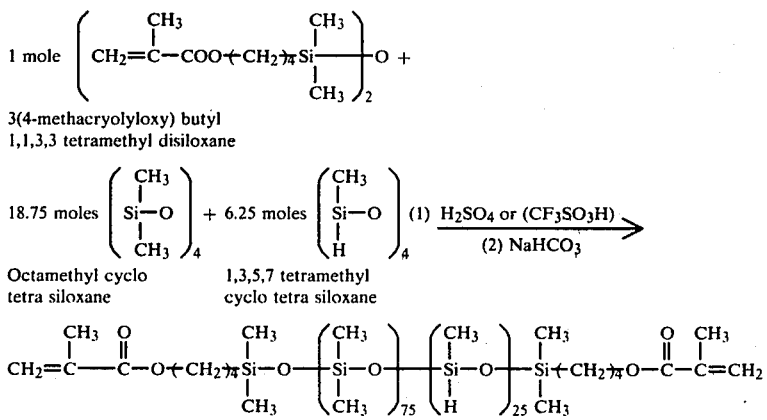

These polymers and copolymer can be used to make biomedical devices, i.e., shaped articles, such as, dialyzer diaphragms, to prepare artificial kidneys and other biomedical implants, such as disclosed in Wichterle, U.S. Pat. No. 2,976,576 and Wichterle, U.S. Pat. No. 3,220,960. The instant polymers and copolymers can be used in preparing therapeutic bandages as disclosed in Shepherd, U.S. Pat. No. 3,428,043. The instant polymers and copolymers can also be used in preparing medical surgical devices, e.g., heart valves, vessel substitutes, intrauterine devices, membranes and other films, dialyzer diaphragms, catheters, mouth guards, denture liners and other such devices as disclosed in Shepherd, U.S. Pat. No. 3,520,949 and Shepherd U.S. Pat. No. 3,618,231. The instant polymers and copolymers can be used to modify collagen to make blood vessels, urinary bladders and other such devices as disclosed in Kliment, U.S. Pat. No. 3,563,925. The instant polymers and copolymers can be used to make catheters as disclosed in Shepherd, U.S. Pat. No. 3,566,874. The instant polymers and copolymers can also be used as semi-permeable sheets for dialysis, artificial dentures and all of such disclosures as set forth in Spoy, U.S. Pat. No. 3,607,848. The instant polymers and copolymers can also be used in ophthalmic prostheses and all other uses disclosed in Wichterle U.S. Pat. No. 3,679,504.

When the term "shaped article for use in biomedical applications" or "biomedical device" are used herein, it is meant that the materials disclosed herein have physiochemical properties rendering them suitable for prolonged contact with living tissue, blood and the mucous membrane such as would be required for biomedical shaped articles, such as, surgical implants, blood dialysis devices, blood vessels, artificial ureters, artificial breast tissue and membranes intended to come in contact with body fluids outside of the body; for example, membranes for kidney dialysis and heart/lung machines, and the like. It is known that blood, for example, is rapidly damaged in contact with artificial surfaces. The design of a synthetic surface which is antithrombogenic and nonagmolytic to blood is necessary for prosthesis and devices used with blood. The instant polymers and copolymers are compatible with living tissue.

EXAMPLE I 557 g of 1,3-bis(4-hydroxybutyl)tetramethyl disiloxane, 634 g of dry pyridine and 2 liters of hexane are charged to a 5 liter reaction flask equipped with a mechanical stirrer and drying tube. The mixture is chilled to 0° C. and then 836 g of methacryloyl chloride is added dropwise. The mixture is agitated continuously overnight. The reaction solution is extracted consecutively with 10% water solutions of HCl and NH3 in order to remove excess reagents and pyridine hydrochloride. The resulting solution of the product in hexane is dried with anhydrous MgSO4, filtered, and solvent removed at reduced pressure. About 459 g (55% yield) of 1,3-bis(4-methacryloxy butyl)tetramethyl disiloxane is collected. The structure is confirmed by infrared spectra, proton magnetic resonance spectra and elemental analysis. IR spectra shows no intense hydroxyl band between 3100 and 3600 cm$^{-1}$ but does show strong methacrylate absorptions at 1640 and 1720 cm$^{-1}$. PMR spectra agreed with the proposed structure.

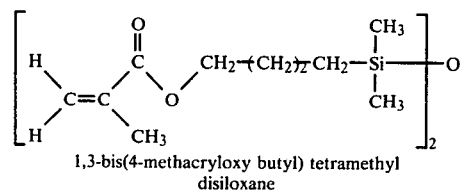

1,3-bis(4-methacryloxy butyl) tetramethyl disiloxane

EXAMPLE II 148.7 g of octamethylcyclotetrasiloxane, available from Silar Labs, 10 Alplaus Road, Scotia, NY 12302, 40.2 g of tetramethylcyclotetrasiloxane, available from Silar Labs, 11.1 g of 1,3-bis(4-methacryoxybutyl)tetramethyl disiloxane as prepared in Example I and 2.0 of 95%-98% H2SO4 are charged, under dry air, to a 500 ml 2-neck reaction flask equipped with a mechanical stirrer. The mixture is agitated continuously for 20 hours at which time 17 g of powdered sodium bicarbonate is added to the reaction mixture and stirred for two hours. The resulting mixture is then diluted with 500 mls of hexane, dried over anhydrous MgSO4, filtered and the solvent removed at reduced pressure. The cyclics are removed under high vacuum (0.050 mm) at 60° C. for one hour. 180 g of a methacrylate endcapped 25 mole percent silicone hydride polydimethylsiloxane is collected. The polymer is a clear colorless fluid which has a viscosity of 1.1 stokes by Cannon viscometer. The structure is confirmed by infrared spectra, proton magnetic resonance spectra and silicone hydride analysis to be:

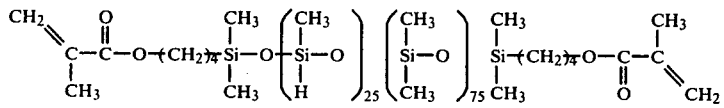

The product is a random copolysiloxane.

EXAMPLE III 122.4 g of octamethyl cyclotetrasiloxane, available from Silar Laboratories, 10 Alphaus Road, Scotia, New York 12302, 66.17 g of tetramethyl cyclotetrasiloxane, available from Silar Laboratories, 11.4 g of 1,3-Bis(4-methacryoxybutyl) Tetramethyl disiloxane as prepared in Example I and 2 g of 95%-98% H2SO4 are charged under dry air to a 500 ml 2-neck reaction flask equipped with a mechanical stirrer. The mixture is agitated continuously for 20 hours at which time 17 g of powdered sodium bicarbonate is added to the mixture and stirred for two hours. The resulting mixture is then diluted with 500 mls of hexane, dried with anhydrous MgSO4, filtered and the solvent removed at reduced pressure. Cyclics are removed under high vacuum (0.05 mm) at 60° C. for one hour. 180 grams of a methacrylate end capped 40 mole % silicone-hydride polydimethylsiloxane is collected. The polymer is a clear, colorless fluid with a viscosity of 0.8 stokes measured by Cannon Viscometer. Structure is confirmed by infrared spectra, proton magnetic resonance spectra and siloxane-hydride analysis to be:

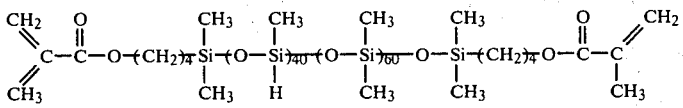

The product is a random copolysiloxane.

EXAMPLE IV 1,700 mls of dried peroxide free tetrahydrofuran, available from Fisher Scientific Company, 15 Jet View Drive, P.O. Box 8740, Rochester, NY 14624 and 158.7 g potassium metal, available from Fisher Scientific, are charged under dry nitrogen into a 5,000 ml three-neck round bottom flask equipped with mechanical stirrer. The solution is chilled to 10° C., using an icewater bath and 494 ml of diethylene glycol monomethyl ether, available from Chemical Samples Company, 4692 Kenny Road, Columbus, OH 43221, is added dropwise. The potassium metal reacts within 24 hours at which time 350 mls of allyl chloride available from Aldrich, 159 Forest Street, Metuchen, NJ 08840, is added dropwise at such a rate to maintain a gentle reflux. After the reaction is allowed to continue overnight, one liter of distilled water is added to the reaction vessel to dissolve the precipitated salts. The tetrahydrofuran layer is washed three times with a salt water solution (270 g NaCl to 1 liter $H_2O$) to remove excess alcohol. The tetrahydrofuran is removed with a water aspirator and the product is distilled at reduced pressure. 410 g of diethylene glycol allyl methyl ether is obtained (b.p. 109° C./30 mm). The analytical data is consistent with a product of the general formula:

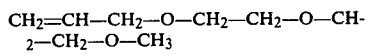

per 1000 Pt solution in the form of $H_2PtCl_6\cdot 6H_2O$, available from Fisher, in 2-propanol is added to the mixture. 40 mls of hexane are distilled to remove water and alcohol. The mixture is cooled to 40° C. at which time 40 g of methacrylate endcapped 25 mole percent silicone hydride polydimethylsiloxane, as prepared in Example II, is added. Distillation is continued for one hour at which time the temperature is at 80° C. About 200 mls of hexane have been removed. Infrared spectra at 2175 $cm^{-1}$ shows no remaining silicone hydride bond.

The mixture is cooled and diluted with hexane to a total volume of 500 mls. The mixture is divided and added to two slurry packed 600 mm×45 mm fritted silica gel chromotography columns layered with 0.5 cm Celite and 1.5 cm sea sand. Each column is eluted with 2000 ml of a 1:1 hexane/ether mixture. This fraction contains the excess allylic ether. Each column is then eluted with 2000 ml of a 1:1 hexane/acetone mixture. This fraction contains the polymer. The resulting solution of the product which is in hexane is dried with anhydrous $MgSO_4$, filtered and the solvent is removed at reduced pressure. 45 g of a methacrylate endcapped 25 mole percent silicone diethylene glycol propyl methyl ether polydimethylsiloxane is obtained. The product is a clear, colorless fluid with a viscosity of 4.0 Stokes, using a Cannon viscometer. Analytical data confirms structure to be:

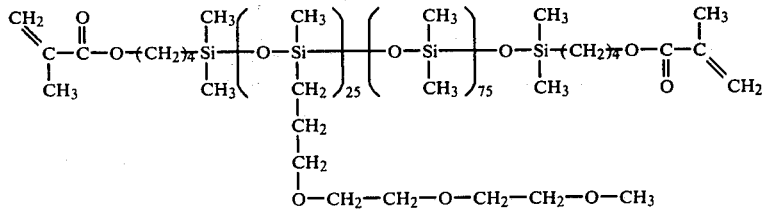

EXAMPLE V 46.1 g of diethylene glycol allyl methyl ether, as prepared in Example IV, followed by 320 mls of hexane, are passed through 42.9 g of activated F-20 alumina, available from Alcoa, Bauxite, AR 72011, into a 1000 ml three-neck flask equipped with mechanical stirrer, thermometer and nitrogen inlet. 40 µl of 20 parts

EXAMPLE VI

Films of the fluid product obtained in Example V are cast between glass plates by adding 1% diethoxyacetophenone, available from Upjohn Company, La Porte, Texas 77571, to the monomer. The material is then irradiated with UV light for two hours. The glass plates are separated and the film is removed. Colorless, optically clear films are obtained such as represented by the three dimensional network polymer below:

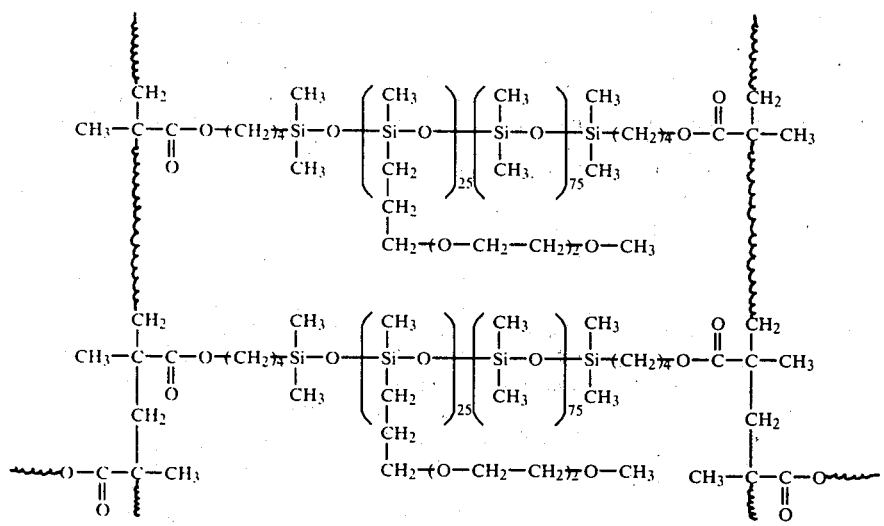

The following physical properties are measured on an Instron tester ASTM D 1708 using standard "dog bone" samples cut from 0.2 mm thick films. This test is used on all the examples where tensile strength, modules and elongation are measured.

Tensile Strength—24 g/mm²
Tensile Modules—58 g/mm²
Elongation—56%

The oxygen permeability of the above sample is determined by the following technique. The test is measuring the oxygen permeability of a material while it is wet with distilled water. This is an attempt to simulate the condition of a contact lens when on the human eye. Two chambers filled with distilled water at 32° C. are connected together by a common passageway. Across this passageway is place the material to be tested. The oxygen concentration in the first chamber is lowered by bubbling nitrogen gas into the second chamber until the oxygen concentration in the first chamber is below about 0.1 ppm. Aerated distilled water is introduced into the second chamber. There is located in the first chamber an oxygen sensing electrode which measures the oxygen concentration in the first chamber. This measures the oxygen permeability of the material covering the passageway between the two chambers. The oxygen permeability of the sample can be calculated from the rate of oxygen concentration change in the first chamber. The unit of oxygen permeability is c.c. (STP) cm/sec cm² mm Hg. The oxygen permeability of the above sample is $1.33 \times 10^{-9}$ cc-cm/sec-cm²-mm Hg which is 18 times more oxygen permeable than the control material polyhydroxy ethyl methacrylate hydrogel (PHEMA).

EXAMPLE VII

The fluid product of Example V together with 1% diethoxyacetophenone is placed in a suitable contact lens spin casting mold and a contact lens is prepared as taught in U.S. Pat. No. 3,408,429. After 2 hours irradiation with UV light, a cured optically clear, hydrophilic contact lens is obtained. The sessile drop contact angle using distilled water on this lens is 55°. The lens was worn by a monkey during clinical testing without trauma. In contrast, a methacrylate endcapped polydimethylsiloxane as prepared in Example VI of U.S. Pat. No. 4,153,641, has a sessile drop contact angle of 110° C. measured using distilled water.

EXAMPLE VIII 77.6 g of diethylene glycol allyl methyl ether as prepared in example IV and 320 mls of hexane are passed through 40.0 g of activated F-20 alumina into a 1000 ml 3-neck flask equipped with a mechanical stirrer, a thermometer, and a nitrogen inlet. 40 microliters of a 20 parts per thousand Pt solution in the form of $H_2PtCl_6.6H_2O$ in 2-propanol is added to the mixture. 40 mls of hexane is distilled to remove the water and alcohol. The mixture is cooled to 40° C. at which time 40 g of methacrylate end capped 40 mole percent silicone hydride polydimethyl siloxane as prepared in Example III is added. Distillation is continued for one hour at which time the temperature is at 80° C. About 200 mls of hexane is removed. Infrared spectra at 2175 cm⁻¹ shows no remaining silicone hydride bond. Purification is completed exactly like that of Example V. 50 grams of a methacrylate end capped 40 mole percent silicone diethylene glycol propyl methyl ether polydimethylsiloxane is obtained. The product is a clear, colorless fluid with a viscosity of 8.5 stokes by Cannon Viscometer. Analytical data confirms structure to be:

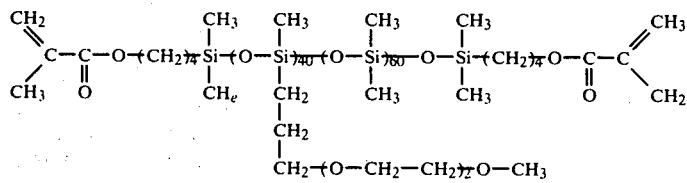

EXAMPLE IX

Films of the fluid product obtained in Example VIII are cast between glass plates by adding 1% diethoxy acetophenone to the monomer and irradiating with UV light for two hours. The glass plates are separated and the film removed. Colorless, optically clear films are obtained.

The oxygen permeability of the above sample is determined by the procedure as described in Example VI. The oxygen permeability of the sample is $6.5 \times 10^{-10}$ cc cm/sec cm$^2$ mm Hg which is 9.4 times more oxygen permeable than the control material polyhydroxyethylmethacrylate hydrogel (PHEMA).

EXAMPLE X

The fluid product of Example VIII together with 1% diethoxy acetophenone is placed in a suitable contact lens spin casting mold and a contact lens is prepared by the same method as taught in U.S. Pat. No. 3,408,429. After 2 hours irradiation with UV light, a cured optically clear, hydrophilic contact lens is obtained. The sessile drop contact angle using distilled water on this lens is 50°.

EXAMPLE XI 59.7 g of peroxide free diethylene glycol allylmethyl ether prepared as in Example IV, 0.010 g H$_2$PtCl$_6$.6H$_2$O in 1 ml of 2-propanol and 200 ml of toluene are added under dry nitrogen to a 500 ml round bottom 2-neck flask and mixed. The mixture is heated to reflux and dried by azeotropic distillation. The mixture is cooled and 100 mls of heptamethyl cyclotetrasiloxane, available from Silar Laboratories, Inc., is added. The mixture is heated to reflux for two hours at which time infrared spectra bond at 2175 cm$^{-1}$ shows no silicone hydride. The mixture is cooled and solvent is removed under aspirator vacuum. The crude product that remains is vacuum distilled. 135 g of 3(diethylene glycol methyl ether)propyl heptamethylcyclotetrasiloxane is obtained (b.p. 96° C./0.025 mm). Analytical data confirms structure to be:

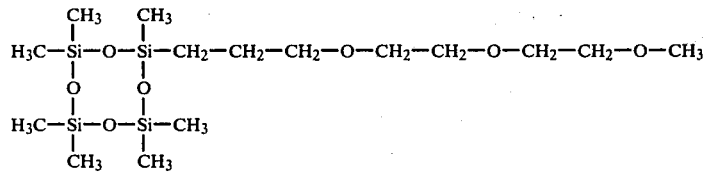

EXAMPLE XII 50 g of peroxide free 3(diethylene glycol methyl ether)propyl heptamethyl cyclotetrasiloxane as prepared in Example XI is added to a 100 ml round bottom 2-neck flask equipped with a mechanical stirrer, a reflux condensor and a nitrogen inlet. The flask is heated for one hour at 110° C. using an oil bath at which time 1.9 g of 1,3-bis(4-methacryloxybutyltetramethyldisiloxane as prepared in Example I and 0.05 g of dry cesium hydroxide available from I.C.N. Pharmaceutical, Plainview, N.J., are added. A substantial increase in viscosity is observed within five minutes. The mixture is heated for an additional hour, then cooled to room temperature and neutralized with 0.04 g of acetic acid for one hour. The mixture is then diluted with hexane, dried for one hour over anhydrous MgSO$_4$, filtered and the solvent removed at reduced pressure. The low molecular weight cyclics are removed by precipitation with a water-methanol mixture. A clear colorless fluid material is obtained.

EXAMPLE XIII

The fluid product of Example XII together with 1% diethoxy acetophenone is placed in a suitable contact mold and a contact lens is prepared by the same method as taught in U.S. Pat. No. 3,408,429. After two hours of irradiation with UV light, a cured optically clear, hydrophilic contact lens is obtained. The sessile drop contact angle using distilled water on the lens is 55°.

EXAMPLE XIV 50 g of peroxide free 3(diethylene glycol methyl ether)propyl heptamethycyclotetrasiloxane as prepared in Example XI is added to a 100 ml round bottom 2-neck flask equipped with a mechanical stirrer, a reflux condensor and a nitrogen inlet. The flask is heated for one hour at 110° C. using an oil bath at which time 0.5 g of tetramethyltetravinylcyclotetrasiloxane, available from Silar Laboratories, is added. 0.05 g of dry cesium hydroxide is then added. A high molecular weight immobile polymer forms in five minutes. The mixture is heated for an additional hour then cooled to room temperature and neutralized with 0.04 g of acetic acid in 10 mls of hexane. The mixture is then diluted with an additional 100 mls of hexane, dried over anhydrous MgSO$_4$, filtered and the solvent removed at reduced pressure. The polymer is purified by precipitation from a water-methanol mixture. The product is a clear, colorless high molecular weight immobile polymer. Analytical data confirms structure. The polymer is: 25 mole percent 3(diethylene glycol methyl ether) x mole percent polydimethylsiloxane.

EXAMPLE XV

A film of the product obtained in Example XIV is cast between glass plates by adding 1% benzoyl peroxide, available from the Pennwalt Corporation, Pennwalt Bldg., Three Parkway, Philadelphia, Pa. 19102, and heating eight hours at 80° C.

The glass plates are separated and the film removed. A colorless optically clear, hydrophilic film is obtained which has a sessile drop contact angle with distilled water of 55°.

EXAMPLE XVI 50 g of peroxide free 3-(diethylene glycol methyl ether)propyl heptamethylcyclotetrasiloxane as prepared in Example XI is added to a 100 round bottom 2-neck flask equipped with a mechanical stirrer, a reflux condensor and a nitrogen inlet. The material is heated for one hour at 110° C. using an oil bath. At this time 0.5 g of dry cesium hydroxide is added. A high molecular weight polymer is formed in five minutes. The reaction mixture is then cooled to 90° C. and 0.1 g of distilled water is added. A substantial decrease in viscosity is observed within five minutes. The mixture is heated for an additional hour. The mixture is then cooled, diluted with 200 mls of hexane, washed with distilled water, dried over anhydrous MgSO$_4$ and the hexane removed at reduced pressure. A clear fluid silanol end capped 25 mole percent silicone diethylene glycol propyl methyl ether polydimethylsiloxane is obtained. Analytical data confirms structure.

EXAMPLE XVII 2.0 g of the material prepared in accordance with Example XVI is mixed with 0.15 g of ethylsilicate prepolymer (M$_v$600) available from Petrarch, P.O. Box 141, Levittown, Pa. 19059, 0.025 g of trimethoxy phenylsilane available from Silar Lab. and 10 microliters of dibutyltin dilaurate available from Alfa Products, Beverly Mass. A film is cast from the above mixture between glass plates by heating in an 80° C. air oven for 8 hours. The glass plates are separated and the film removed. A colorless, optically clear, hydrophilic film is obtained which has a sessile drop contact angle with distilled water of 55°.

EXAMPLE XVIII

To 72.7 parts of the monomer prepared as in Example V is added 18.2 parts of isobornyl acrylate, available from Rohm and Haas, Independence Hall West, Philadelphia, Pa. 19105 and 9.1 parts of acrylic acid and one part diethoxyacetophenone. After mixing, a film is cast between glass plates. The film is irradiated with UV light for two hours. The film is released, extracted for four hours in a 1:1 hexane/isopropanol mixture and buffered. This buffering procedure consists of placing the film to be tested, which is about 2"×3" in size, into 100 cc of 0.1 N ammonium hydroxide for 24 hours. Then the film is soaked in an isotonic phosphate buffer (pH 7.2), i.e., Na$_2$HPO$_4$, NaHPO$_4$ and NaCl for another 24 hours. This buffered saline solution is made by mixing 1.403 g of Na$_2$HPO$_4$, 0.458 g of NaH$_2$PO$_4$ and 8.0 g of NaCL with water to make a final volume of one liter. The film is then stored in an isotonic buffered saline solution (pH 7.2).

The test procedure for determining the percent of water in the film is as follows:

A 0.3 g sample is taken from the above hydrated film. The sample of film is roller dried and immediately weighed to the nearest milligram. The weighed film is placed into a vacuum oven (1 cm Hg) overnight at 80° C. Then the material is cooled and the vacuum broken by admitting dry air. After the sample is at room temperature for about 15 minutes, the sample is weighed to the nearest milligram. The percent water is calculated as follows:

Percent Water = Wet Weight − Dry Weight/Wet Weight · 100

The percent water for the above sample is 18%. The oxygen permeability of the above sample, in the buffered form, is determined by the same technique described in Example VI except buffered saline is used in place of distilled water. The oxygen permeability of the above sample is 6.7×10$^{-10}$ cc cm/sec-cm$^2$-mm Hg which is 8.2 times more oxygen permeable than the control material polyhydroxyethyl methacrylate hydrogel.

The following physical properties are measured as described in Example VI:
Tensile strength—36 g/mm$^2$
Tensile Modules—72 g/mm$^2$
Elongation—84%

EXAMPLE XIX 72.7 parts of the monomer as prepared in Example V are mixed with 18.2 parts of isobornyl acrylate and 9.1 parts of acrylic acid and one part diethoxyacetophenone. 30 μl of the mixture is placed in a suitable contact lens spincasting mold and a contact lens is prepared as taught in U.S. Pat. No. 3,408,429. After two hours irradiation with UV light, a cured contact lens is obtained. The lens formed is soft, water absorbing, hydrophilic, optically clear, elastic and strong. The lens was worn during clinical testing without trauma for 24 hours by a monkey.

EXAMPLE XX 540 mls of dried peroxide free tetrahydrofuran and 21.5 g of potassium metal are charged into a 2000 ml three-neck flask equipped with mechanical stirrer and a dry nitrogen inlet. 88.4 ml of triethylene glycol monomethyl ether, available from Chemical Samples Co., is added to the mixture dropwise. After the potassium metal has completely reacted, 48.6 ml of allyl chloride is added dropwise to the mixture at such a rate in order to maintain a gentle reflux. After the reaction is complete, 500 mls of distilled water are added in order to dissolve the precipitated salt. The tetrahydrofuran layer is washed with salt water (270 g NaCl/1 liter water) in order to remove the excess alcohol. The resulting product in tetrahydrofuran is collected and the tetrahydrofuran is removed with a water aspirator. The product is distilled at reduced pressure. 75.5 g (74% yield) of triethylene glycol allyl methyl ether is obtained (b.p. 97° C.-100° C./2 mm). The analytical data is consistent with a product of the general formula:

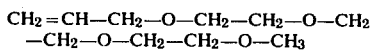

EXAMPLE XXI 58.8 g of triethylene glycol allyl methyl ether, as prepared in Example XX followed by 320 mls of hexane are passed through 54.7 g of activated F-20 alumina into a 1000 ml three-neck flask equipped with mechanical stirrer, thermometer and a dry nitrogen inlet. 40 μl of 20 ppt Pt in 2-propanol is added to the mixture. The mixture is warmed and dried by azeotropic distillation. The mixture is cooled to 40° C. at which time 40 g of the methacrylate endcapped 25 mole percent hydride polysiloxane as prepared in Example II is added. Slow distillation is continued for one hour at which time the mixture temperature is 80° C. and about 200 mls of hexane have been removed. Infrared spectra shows that the reaction is complete. The polymer is purified by precipitation from a 1:1 mixture of methanol and water. Analytical data confirms the structure to be:

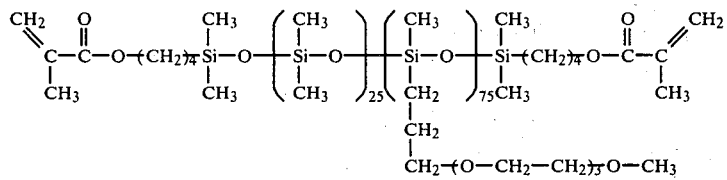

EXAMPLE XXII

The fluid product obtained in Example XXI together with 1% diethoxyacetophenone is placed in a suitable contact lens spin casting mold and a contact lens is prepared by the same method as taught in U.S. Pat. No. 3,408,429. After two hours irradiation with UV light, a cured optically clear, hydrophilic contact lens is obtained. The contact lens has a low contact angle with water.

EXAMPLE XXIII 1200 mls of dried peroxide free tetrahydrofuran and 100 g of potassium metal are charged into a 3000 ml 3-neck flask equipped with a mechanical stirrer, a thermometer and a dry nitrogen inlet. 317.7 mls of solketal, available from Aldrich, is added dropwise. After reacting overnight, the potassium metal is reacted completely. 188.5 mls of allyl chloride is added dropwise at such a rate to maintain a gentle reflux. After reacting the mixture again overnight, 850 mls of distilled water are added to dissolve the precipitated salt. The tetrahydrofuran (THF) layer is washed with a salt water solution to remove excess solketal. The resulting product in THF is collected and the THF removed with a water aspirator. The product is distilled at reduced pressure. 261.4 mls of solketal allyl ether (b.p. 76° C./14 mm) is obtained. Analytical data confirms structure to be:

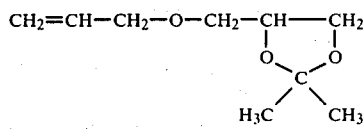

EXAMPLE XXIV 49.5 g of solketalallylether as prepared in Example XXIII followed by 320 mls of hexane are passed through 46.1 g of activated F-20 alumina into a 1000 ml three-neck flask equipped with mechanical stirrer, thermometer and a nitrogen inlet. 40 μl of 20 ppt Pt in 2-propanol is added to the mixture followed by azeotropic distillation to remove alcohol and water. The charge is cooled to 40° C. and 40 g of the methacrylate endcapped 25 mole percent hydride polysiloxane prepared as in Example II is added. Slow distillation continues for one hour during which time the mixture temperature increases to 80° C. and about 200 mls of hexane are removed. Infrared spectra confirms the reaction is complete. The polymer is purified by precipitation from a 1:1 mixture of water and methanol. Analytical data confirms the structure to be:

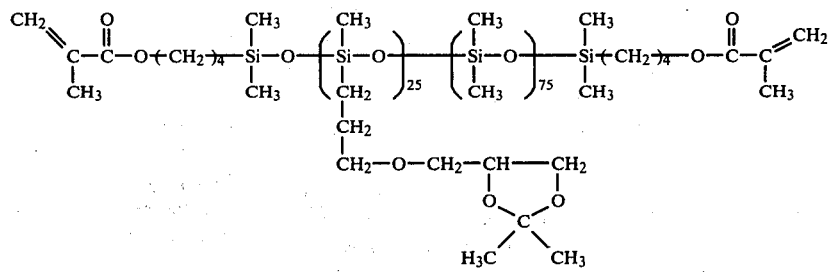

EXAMPLE XXV 5.0 g of the polymer as prepared in Example XXIV 52 mls of glacial acetic acid available from Fisher, and 4.2 mls of distilled water are charged to a 100 ml round bottom flask and heated to 50° C. overnight at which time the acetic acid, acetone formed during reaction and water are removed under high vacuum. Infrared shows a large hydroxyl bond and the ketal doublet at 1380 cm$^{-1}$ is gone. The polymer is a clear fluid material of the following structure:

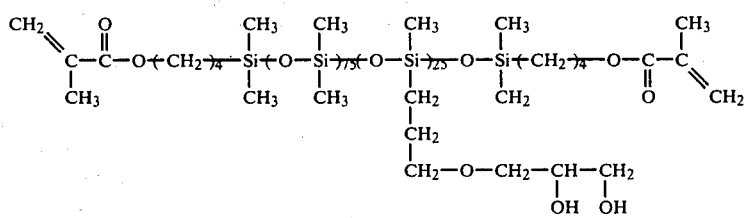

EXAMPLE XXVI

The fluid product obtained in Example XXIII together with 1% diethoxy acetophenone is placed in a suitable contact lens spin casting mold and a contact lens is prepared by the same method as taught in U.S.

Pat. No. 3,408,429. After two hours irradiation with UV light, a cured optically clear, water absorbing, hydrophilic contact lens is obtained. The percent water as determined by the procedure in Example XVIII is 13%. The sessile drop contact angle measured using distilled water is low.

EXAMPLE XXVII 34.9 g of O-trimethylsilyl allyl alcohol available from Petrarch Inc., P.O. Box 141, Levittown, Pa. 19059, 40 µl of 20 ppt Pt in 2-propanol and 320 mls of hexane are charged into a 1000 ml three-neck flask equipped with a mechanical stirrer, a nitrogen inlet and a thermometer. The mixture is warmed to reflux and dried by azeotropic distillation followed by cooling to 40° C. 40 g of the methacrylate endcapped 25 mole percent silicone hydride polysiloxane as prepared in Example II is added. Distillation is continued for one hour during which time the mixture temperature increases to 80° C. and about 200 mls of hexane are removed. Infrared spectra confirms that the reaction is complete. The polymer is purified by precipitation from a 1:1 mixture of methanol and water. A clear fluid polymer is obtained having the following structure as confirmed by analytical data:

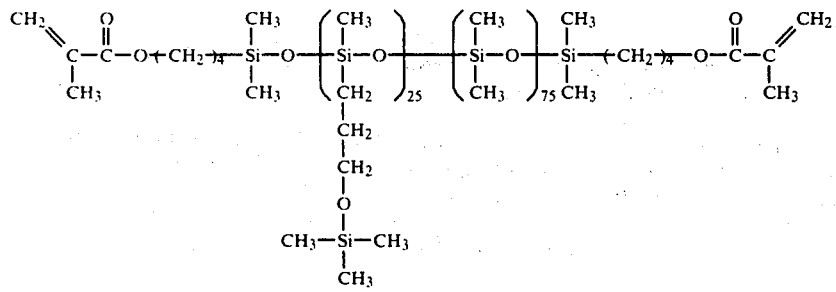

EXAMPLE XXVIII 5.0 g of the polymer as prepared in Example XXVII, 52 mls of glacial acetic acid and 4.2 mls of distilled water are charged to a 100 ml flask and heated to 50° C. overnight at which time the acetic acid and water are removed under high vacuum. Infrared shows a large hydroxyl band. The polymer is a clear fluid material of the following structure:

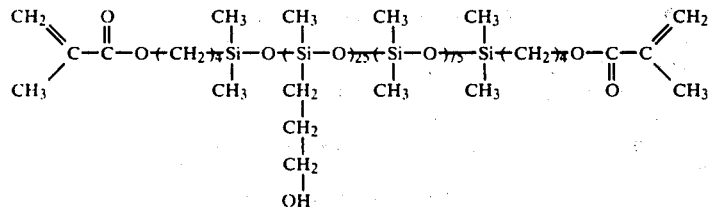

EXAMPLE XXIX

The fluid product obtained in Example XXVIII together with 1% diethoxyacetophenone is placed in a suitable contact lens spin casting mold and a contact lens is prepared by the same method as taught in U.S. Pat. No. 3,408,429. After two hours irradiation with UV light, a cured optically clear, hydrophilic, as measured by its low contact angle with water, contact lens is obtained.

EXAMPLE XXX

In a 2 liter, three-necked flask fitted with mechanical stirrer, reflux condensor and a dropping funnel is placed 714 g of 2-allyl oxyethanol available from Haven Chemical Co., 5000 Langdon Street, Philadelphia, Pa. 19124. 600 g of phosphorous tribromide is added to the mixture dropwise while stirring. This is done over a period of about two hours. The temperature is permitted to rise until the reaction mixture gently refluxes. The mixture is then distilled and the distillate below 160° C. is collected in a 2-liter flask with 1 liter of distilled water. The crude 2-allyloxyethylbromide is dried over calcium chloride and distilled. Pure 2-allyloxyethylbromide is obtained.

750 mls of dried peroxide free tetrahydrofuran and 14.9 g of potassium metal are charged under dry nitrogen into a 2000 ml three-neck flask equipped with mechanical stirrer, condensor and an addition funnel. 55 g of solketal is added dropwise. Potassium metal reacts completely within 24 hours at which time 68.9 g of the 2-allyloxyethylbromide is added at such a rate as to maintain a gentle reflux. After an overnight reaction, 500 mls of distilled water are added to the reaction vessel to dissolve the precipitated salts. The THF is then removed with a water aspirator. The product is distilled at a reduced pressure. Pure 2-allyloxyethyl solketal is obtained. Analytical data confirms structure to be:

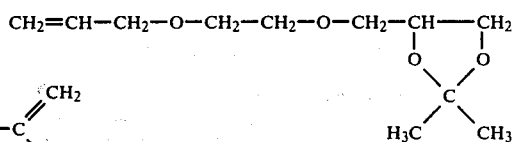

EXAMPLE XXXI 62.2 g of the 2-allyloxyethylsolketal as prepared in Example XXX followed by 320 mls of hexane is passed through 57.9 g of activated F-20 alumina into a three-neck flask equipped with mechanical stirrer and a dry nitrogen inlet. 40 μl of 20 ppt Pt in 2-propanol is added to the mixture. 40 mls of hexane are distilled to remove water and alcohol. The mixture is cooled to 40° C., at which time 40 g of the methacrylate endcapped hydride polydimethylsiloxane as prepared in Example II is added. Distillation is continued for one hour at which time the mixture temperature is 80° C. About 200 mls of hexane are removed. Infrared spectra at 2175 cm$^{-1}$ confirms the reaction is complete. The polymer is purified by precipitation from a 1:1 methanol/water mixture. A clear fluid polymer is obtained. Analytical data confirms the structure to be:

acetic acid in 800 mls of toluene is added at such a rate to maintain a gentle reflux. A precipitate of potassium chloroacetate forms. After all the chloroacetic acid is added the mixture is refluxed and stirred for 48 hours.

When the reaction is complete, the flask is cooled and the reaction mixture is transferred to a 5-liter separatory funnel and extracted with three one-liter portions of water. The water extract is acidified with 20% HCl. The crude allyloxyacetic acid that is produced is extracted three times with ether. The ether extracts are combined and the solvent removed by distillation on a steam bath. The residue is then fractionally distilled under reduced pressure. Pure allyloxyacetic acid is

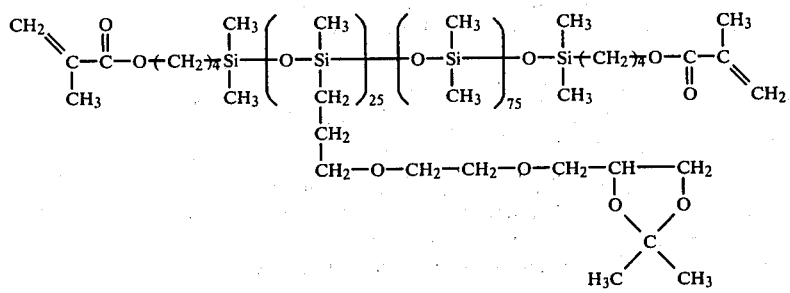

EXAMPLE XXXII 5.0 g of the polymer as prepared in Example XXXI, 52 mls of glacial acetic acid and 4.2 mls of distilled water are charged to a 100 ml flask and heated to 50° C. overnight. Then the acetic acid, water and acetone formed are removed under high vacuum. Infrared shows a large hydroxyl bond and the ketal doublet at 1380 cm$^{-1}$ is gone. A clear fluid material of the following structure is obtained:

obtained.

200 g of thionyl chloride is charged to a one-liter three-neck flask equipped with a 250 ml dropping funnel, an efficient condensor and a mechanical stirrer. To this mixture is added dropwise and with rapid stirring, 116 g of allyloxyacetic acid. An evolution of hydrogen chloride and sulfur dioxide takes place. When all the acid has been added, the mixture is heated to 80° C. and kept at this temperature for two hours. Then the remaining thionyl chloride is removed on steam bath

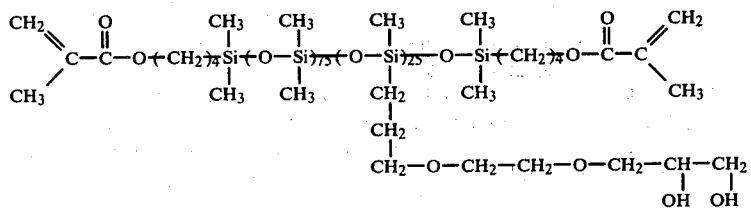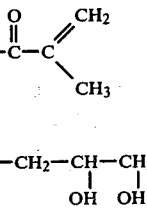

EXAMPLE XXXIII

The fluid product obtained in Example XXXII together with 1% diethoxyacetophenone is placed in a suitable contact lens spin casting mold and a contact lens is prepared by the same method as taught in U.S. Pat. No. 3,408,429. After two hours irradiation with UV light, a cured optically clear and hydrophilic, as measured by its low contact angle with water, contact lens is obtained.

EXAMPLE XXXIV 163.3 g. of allyl alcohol available from Aldrich in one liter of toluene is charged under dry nitrogen to a 5-liter three-necked flask fitted with a mechanical stirrer and a reflux condensor. 100 g of potassium metal is added, stirring begins and the charge is heated in an oil bath until the mixture refluxes gently.

After the reaction mixture has refluxed for 15 hours, the temperature of the oil bath is lowered to 85° C.-90° C., at which time a warm solution of 95 g of monochlorunder reduced pressure. The crude acid chloride is obtained.

In a one-liter flask, equipped with mechanical stirrer and a 500 ml dropping funnel and surrounded by an ice salt freezing mixture, is placed 0.5 l of 28% cold, concentrated aqueous dimethylamine available from Aldrich. The crude acid chloride is added to this mixture slowly while stirring. Stirring is continued for one hour after the addition of the acid chloride. The aqueous mixture is extracted three times with 250 mls of diethyl ether in order to collect the amide which forms. The collected ether is removed by heating the mixture on a steam bath. Then the product is fractionally distilled at reduced pressure. Pure allyloxy N,N-dimethyl acetamide is obtained. Analytical data confirms the structure to be:

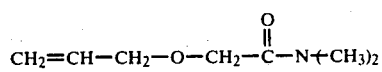

EXAMPLE XXXV 41.1 g of the allyloxyacetamide as prepared in Example XXXIV followed by 320 mls of hexane are passed through 38.3 g of activated F-20 alumina into a 1000 ml three-neck round bottom flask equipped with mechanical stirrer and a nitrogen inlet. 40 μl of 20 ppt Pt in 2-propanol is added to the mixture followed by azeotropic distillation in order to remove water and alcohol. The mixture is cooled to 40° C. at which time 40 g of the methacrylate endcapped 25 mole percent silicone hydride polydimethylsiloxane as prepared in Example II is added to the mixture. Distillation continues for one hour during which time the mixture temperature is increased to 80° C. resulting in about 200 mls of hexane being removed. Infrared spectra confirms the reaction is complete. The polymer is purified by precipitation from a 1:1 mixture of water and methanol. Analytical data confirms the structure to be:

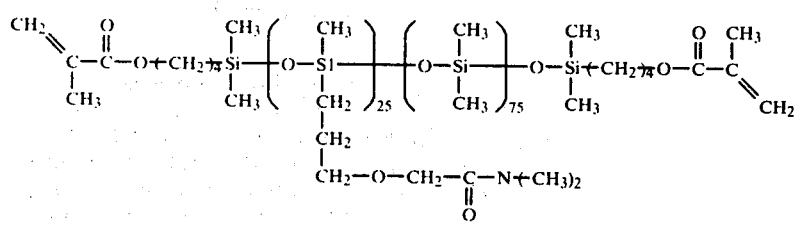

EXAMPLE XXXVI

The fluid product obtained in Example XXXV together with 1% diethoxyacetophenone is placed in a suitable contact lens spin casting mold and a contact lens is prepared by the same method as taught in U.S. Pat. No. 3,408,429. After two hours irradiation with UV light, a cured optically clear and hydrophilic, as measured by its low contact angle with water, contact lens is obtained.

EXAMPLE XXXVII

Synthesis of
1,1,3,3-tetramethyl-1,3-disila-2-oxacyclohexane-5-(N,N-dimethyl carboxamide).

To 218 g. of 1,1,3,3-tetramethyl-1,3-disila-2-oxacyclohexane-5-carboxylic acid (synthesized according to the procedure of Omer W. Steward and Leo H. Sommer, *J. of Organic Chem.*, Vol. 26, page 4132, 1961) in 1000 ml of anhydrous tetrahydrofuran, cooled to −15° C., is added (under anhydrous conditions) 101 g of triethylamine and 108.5 g of ethyl choroformate. After stirring for 15 minutes, dimethyl amine is bubbled through the solution at −15° C. for thirty minutes. The solvent is then removed at reduced pressure. Then 1000 ml of diethyl ether and 100 ml of water is added. The ether phase is separate extracted with 0.1 N aqueous NaHCO₃, 0.1 N aqueous HCl, and dried with MgSO₄. After filtering, the ether is removed to give the cyclic siloxane amide of the formula.

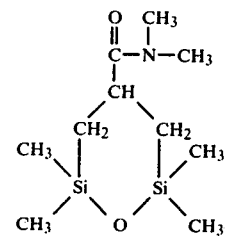

This material is of sufficient purity such that no further purification is necessary.

EXAMPLE XXXVIII 122.5 g of 1,1,3,3-tetramethyl-1,3-disila-2-oxacyclohexane-5-(N,N-dimethyl carboxamide), as prepared in Example XXXVII, 87 g of 1,1,3,3-tetramethyl-1,3-disila-2-oxacyclohexane, available from Silar Laboratories, 10 Alplaus Road, Scotia, New York 12302 and 4.14 g of 1,3-bis(4-methacryloxbutyl)tetramethyl disiloxane, as prepared in Example I are combined in a 250 ml flask. While vigorously stirring 1.52 g of trifluoromethane solfonic acid is added. The reaction is stirred for 12 hours. Then 10 g of NaHCO₃ is added. The product is pressure filtered to give a random copolysiloxane represented by the average formula.

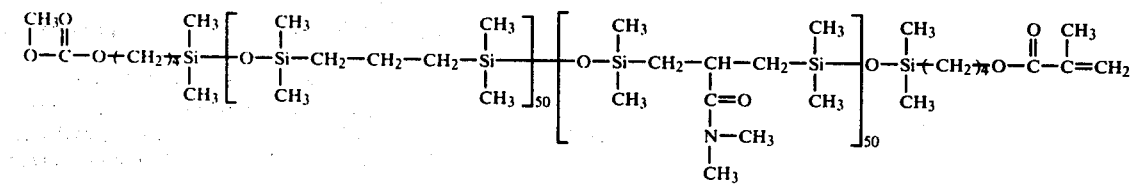

When this random copolysiloxane is mixed with 1% by weight diethoxyacetophenone, cast between glass plates and subjected to ultraviolet radiation, a cast sheet is obtained which is hydrophilic as measured by its low contact angle with water.

We claim:

1. A hydrophilic, hydrolytically stable, biologically inert contact lens with the capability of transporting oxygen sufficiently to meet the requirements of the human cornea, comprising a polysiloxane monomer having the following formula:

-continued

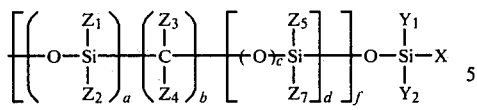

wherein $Y_1$ and $Y_2$ equal the same or different and are selected from the group consisting of a monovalent hydrocarbon having from 1 to 20 carbon atoms and a halogenated monovalent hydrocarbon having from 1 to 20 carbon atoms, X is selected from the group consisting of a hydroxyl radical, a monovalent hydrocarbon having from 1 to 20 carbon atoms, halogenated monovalent hydrocarbon having from 1 to 20 carbon atoms,

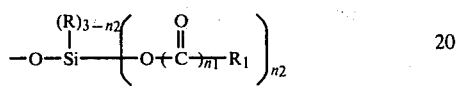

wherein R is a monovalent hydrocarbon having from 1 to 20 carbon atoms, $R_1$ is a monovalent hydrocarbon having from 1 to 20 carbon atoms, $n_1$ is an integer from zero to 1 and $n_2$ is an integer from 1 to 3,

wherein $R_2$ and $R_3$ are the same or different and are monovalent hydrocarbons having from 1 to 20 carbon atoms and $n_3$ is an integer from zero to 1, $-R_4-A$ wherein $R_4$ is a divalent hydrocarbon having from 1 to about 22 carbon atoms and A is a free radical polymerizably activated monovalent unsaturated group, a is at least 1, b is zero or at least 2, c is 1 if b is zero and c is zero if b is at least 2, d is at least 1, except when b is zero and a is 1 then d is zero or greater, e is at least 1 and f is zero or greater, $Z_1$ through $Z_7$ are the same or different and at least one of $Z_1$ through $Z_7$ is equal to a hydrophilic sidechain, said $Z_1$ through $Z_7$ are selected from the group consisting of a monovalent hydrocarbon having from 1 to 20 carbon atoms, a halogenated monovalent hydrocarbon having from 1 to 20 carbon atoms and a hydrophilic sidechain with the following formulas selected from the group consisting of

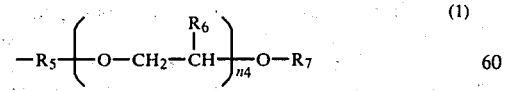 (1)

wherein $R_5$ is a divalent hydrocarbon having from 1 to 10 carbon atoms, $R_6$ is selected from the group consisting of methyl and hydrogen, $R_7$ is selected from the group consisting of hydrogen, a monovalent hydrocarbon having from 1 to 10 carbon atoms,

wherein $R_8$ is selected from the group consisting of a monovalent hydrocarbon having from 1 to 10 carbon atoms and hydrogen, and $n_4$ is at least 1,

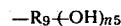

wherein $R_9$ is a hydrocarbon having from 1 to 20 carbon atoms and a valence of $n_5+1$, $n_5$ is at least 1, there cannot be an —OH group on an aliphatic carbon atom beta to the Si atom, and there cannot be more than one OH group on any one carbon atom,

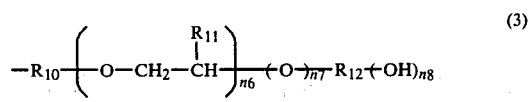 (3)

wherein $R_{10}$ is a divalent hydrocarbon having from 1 to 10 carbon atoms, $R_{11}$ is selected from the group consisting of hydrogen and methyl and $R_{12}$ is a hydrocarbon having from 2 to 20 carbon atoms and a valance of $n_8+1$ and can have no more than one oxygen atom attached to any one carbon atom, $n_6$ is zero or greater, $n_7$ is an integer from zero to 1 and $n_8$ is at least 1,

 (4)

wherein $R_{13}$ is a divalent hydrocarbon having from 2 to 10 carbon atoms and the

group is not attached to a carbon atom of $R_{13}$ which is alpha to the Si atom, $R_{14}$ and $R_{15}$ can be the same or different and are selected from the group consisting of a monovalent hydrocarbon having from 1 to 10 carbon atoms, hydrogen, $-CH_2+CH_2)_{\overline{n_9}}OH$ wherein $n_9$ is an integer from 1 to 3 and

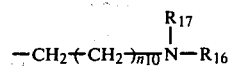

wherein $R_{16}$ and $R_{17}$ are the same or different and are selected from the group consisting of hydrogen and a monovalent hydrocarbon having from 1 to 10 carbon atoms and $n_{10}$ is an integer from 1 to 5,

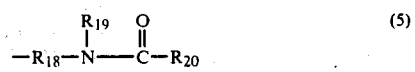 (5)

wherein $R_{18}$ is a divalent hydrocarbon having from 1 to 20 carbon atoms and $R_{19}$ and $R_{20}$ are the same or different and are selected from the group consisting of hydrogen and a monovalent hydrocarbon having from 1 to 10 carbon atoms,

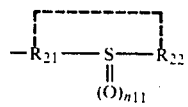 (6)

wherein $R_{21}$ is a divalent or trivalent hydrocarbon having from 1 to 10 carbon atoms and the S atom is not attached to $R_{21}$ by an aliphatic carbon atom beta to the Si atom, $R_{21}$ may or may not be attached to $R_{22}$ to form a ring which contains more than 3 carbon atoms and $R_{22}$ is selected from the group consisting of a hydrocarbon having from 1 to 10 carbon atoms and $-O^{\ominus}M^{\oplus}$ where M is selected from the group consisting of a monovalent metal ion and a quaternery ammonium ion, and $n_{11}$ is an integer from 1 to 2,

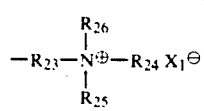 (7)

wherein $R_{23}$ is a divalent hydrocarbon having from 3 to 10 carbon atoms and the $N^{\oplus}$ must be attached to a carbon atom of $R_{23}$ which is at least 2 carbon atoms away from the Si atom, $R_{24}$, $R_{25}$ and $R_{26}$ are the same or different and are monovalent hydrocarbons having from 1 to 10 carbon atoms, $X_1^{\ominus}$ is a monovalent anion selected from the group consisting of halides, $R_{27}$—COO$^{\ominus}$ wherein $R_{27}$ is selected from the group consisting of hydrogen, a monovalent hydrocarbon having from 1 to 10 carbon atoms and a halogenated monovalent hydrocarbon having from 1 to 10 carbon atoms and $R_{28}$—SO$_3^{\ominus}$ wherein $R_{28}$ is selected from the group consisting of a monovalent hydrocarbon having from 1 to 10 carbon atoms and a halogenated monovalent hydrocarbon having from 1 to 10 carbon atoms,

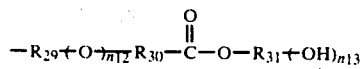 (8)

wherein $R_{29}$ is a divalent hydrocarbon having from 1 to 10 carbon atoms and $n_{12}$ is an integer from 0 to 1 and when $n_{12}$ is 1 the oxygen cannot be attached to an aliphatic carbon atom in $R_{29}$ which is beta to the Si atom, $R_{30}$ is a divalent hydrocarbon having from 1 to 10 carbon atoms, $R_{31}$ is a hydrocarbon having from 2 to 20 carbon atoms and a valence of $n_{13}+1$ and can have no more than one oxygen atom attached to any one carbon atom and $n_{13}$ is at least 1,

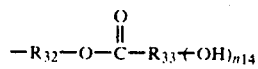 (9)

wherein $R_{32}$ is a divalent hydrocarbon having from 1 to 10 carbon atoms and the ester oxygen atom bonded to $R_{32}$ cannot be attached to an aliphatic carbon atom in $R_{32}$ which is beta to the Si atom, $R_{33}$ is a hydrocarbon having from 2 to 20 carbon atoms and a valence of $n_{14}+1$ and can have no more than one oxygen atom attached to any one carbon atom and $n_{14}$ is an integer of at least 1,

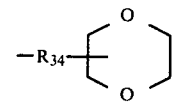 (10)

wherein $R_{34}$ is a divalent hydrocarbon having from 1 to 10 carbon atoms,

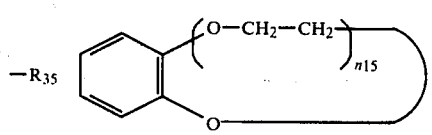 (11)

wherein $R_{35}$ is a divalent hydrocarbon having from 2 to 10 carbon atoms and $n_{15}$ is an integer from 1 to 10,

wherein $R_{36}$ is a divalent hydrocarbon having from 2 to 10 carbon atoms and the carbonyl group is not attached to a carbon atom alpha to the Si atom, $R_{37}$ is selected from the group consisting of methyl and hydrogen, $R_{38}$ is selected from the group consisting of hydrogen, a monovalent hydrocarbon having from 1 to 10 carbon atoms and

wherein $R_{39}$ is a monovalent hydrocarbon having from 1 to 10 carbon atoms and $n_{16}$ is at least 1,

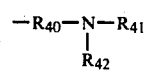 (13)

wherein $R_{40}$ is a divalent hydrocarbon having from 1 to 10 carbon atoms, $R_{41}$ and $R_{42}$ can be the same or different and are selected from the group consisting of hydrogen, a monovalent hydrocarbon having from 1 to 10 carbon atoms and $-(CH_2)_{n_{17}}OH$ wherein $n_{17}$ is an integer from 2 to 4,

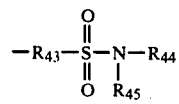 (14)

wherein $R_{43}$ is a divalent hydrocarbon having from 2 to 10 carbon atoms and the S atom cannot be attached to a carbon atom of $R_{43}$ which is alpha to the Si atom, $R_{44}$ and $R_{45}$ can be the same or different and are selected from the group consisting of hydrogen and a monovalent hydrocarbon having from 1 to 10 carbon atoms,

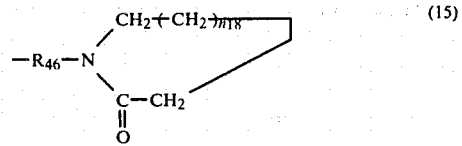 (15)

wherein $R_{46}$ is a divalent hydrocarbon having from 1 to 10 carbon atoms and $n_{18}$ is an integer from zero to 3,

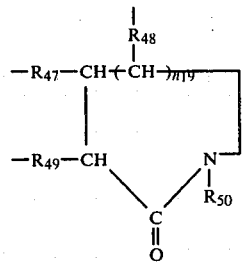 (16)

wherein $R_{47}$ and $R_{48}$ are selected from the group consisting of hydrogen, divalent or monovalent hydrocarbon having from 0 to 10 carbon atoms and $R_{49}$ is selected from the group consisting of hydrogen, divalent or monovalent hydrocarbon having from 1 to 10 carbon atoms and only one of $R_{47}$, $R_{48}$ and $R_{49}$ must be a divalent hydrocarbon and attached to the Si atom, $R_{50}$ is selected from the group consisting of hydrogen, a monovalent hydrocarbon having from 1 to 10 carbon atoms and $-(CH_2)_{n20}OH$ where $n_{20}$ is an integer from 2 to 4, and $n_{19}$ is an integer from zero to 3,

 (17)

wherein $R_{51}$ is a divalent hydrocarbon having from 2 to 10 carbon atoms and the carbonyl group cannot be attached to a carbon atom of $R_{51}$ alpha to the Si atom and $X_2^{\oplus}$ is a monovalent cation selected from the group consisting of monovalent metal cations and

wherein $R_{52}$, $R_{53}$, $R_{54}$ and $R_{55}$ can be the same or different and selected from the group consisting of hydrogen and a monovalent hydrocarbon having from 1 to 10 carbon atoms, and

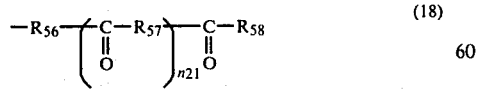 (18)

wherein $R_{56}$ is a divalent hydrocarbon having from 2 to 10 carbon atoms and the carbonyl group cannot be attached to a carbon atom of $R_{56}$ which is alpha to the Si atom, $R_{57}$ is a divalent hydrocarbon having from one to 10 carbon atoms, $R_{58}$ is selected from the group consisting of hydrogen and a monovalent hydrocarbon having from 1 to 10 carbon atoms and $n_{21}$ is an integer from zero to 10, polymerized to form a polymer in a crosslinked network.

2. The contact lens according to claim 1 wherein said hydrophilic sidechains are selected from the group consisting of

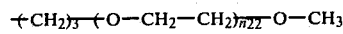

wherein $n_{22}$ is an integer from 2 to 3,

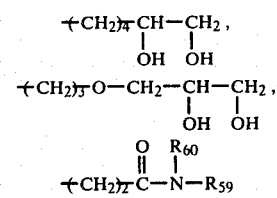

wherein $R_{59}$ and $R_{60}$ are the same or different and are selected from the group consisting of hydrogen, methyl and $-CH_2-CH_2-OH$,

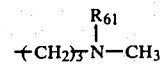

and $R_{61}$ is selected from the group consisting of hydrogen and methyl,

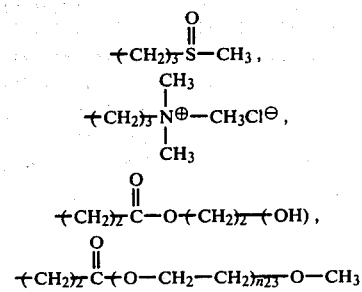

wherein $n_{23}$ is an integer from 2 to 3

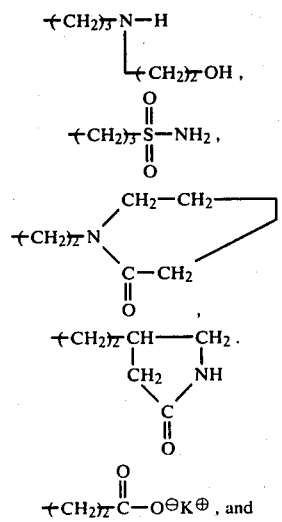

-continued

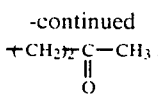

3. The contact lens according to claim 1 wherein X is selected from the group consisting of

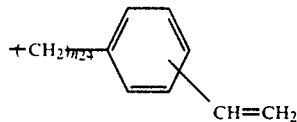

wherein $n_{24}$ is an integer from 0 to 2, —CH=CH$_2$ and —R$_{62}$—G wherein R$_{62}$ is ${+}CH_2{)_{\overline{n25}}}$ wherein $n_{25}$ is an integer from 3 to 4 and G is

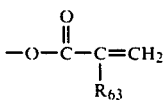

wherein R$_{63}$ is selected from the group consisting of hydrogen and methyl.

4. The contact lens according to claim 1 wherein X is

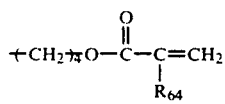

wherein R$_{64}$ is selected from the group consisting of hydrogen and methyl.

5. The polysiloxane monomer according to claim 1 wherein Y$_1$ and Y$_2$ are methyl.

6. The polysiloxane monomer according to claim 1 wherein Y$_1$ is methyl and Y$_2$ is phenyl.

7. The contact lens according to claim 1 wherein only one of Z$_1$, Z$_2$, Z$_5$ and Z$_6$ is a hydrophilic sidechain and wherein a is equal to 1 to about 1,000, b is equal to zero, c is equal to 1, d is equal to 1 to about 1,000, and f is equal to zero.

8. The contact lens according to claim 7 wherein a is equal to about 10 to about 500, b is equal to zero, c is equal to 1, d is equal to about 10 to about 500, e is equal to 1 and f is equal to zero.

9. The contact lens according to claim 8 wherein said contact lens is soft and flexible and a is equal to about 75 to about 150, b is equal to zero, c is equal to 1, d is equal to about 25 to about 50, e is equal to one and f is equal to zero.

10. The soft and flexible contact lens according to claim 9 wherein a is equal to about 75, b is equal to zero, c is equal to 1, d is equal to about 25, e is equal to 1 and f is equal to zero.

11. The contact lens according to claim 10 wherein Z$_1$, Z$_2$ and Z$_5$ are methyls, and Z$_6$ is selected from the group consisting of ${+}CH_2{)_{\overline{3}}}(O{-}CH_2{-}CH_2{)_{\overline{n26}}}O{-}CH_3$ wherein $n_{26}$ is an integer from 2 to 3,

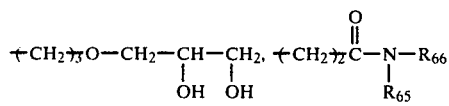

wherein R$_{65}$ is selected from the group consisting of methyl and hydrogen, R$_{66}$ is selected from the group consisting of methyl, hydrogen and —CH$_2$—CH$_2$—OH, Y$_1$ and Y$_2$ equal methyl and X equals

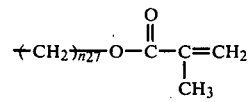

wherein $n_{27}$ is an integer from 3 to 4.

12. The contact lens according to claim 1 wherein only one of Z$_1$ through Z$_7$ is a hydrophilic sidechain and wherein a is equal to 1, b is equal to about 2 to about 4, c is equal to zero, d is equal to 1, e is equal to about 25 to about 500 and f is equal to about 5 to about 500.

13. The contact lens according to claim 12 wherein said contact lens is soft and flexible and a is equal to 1, b is equal to about 2 to about 3, c is equal to zero, d is equal to 1, e is equal to about 25 to about 250 and f is equal to about 10 to about 250.

14. The soft and flexible contact lens according to claim 13 wherein a is equal to 1, b is equal to about 2 to about 3, d is equal to 1, c is equal to zero, e is equal to from about 50 to about 100 and f is equal to from about 10 to about 100.

15. The soft and flexible contact lens according to claim 14 wherein a is equal to 1, b is equal to from about 2 to about 3, c is equal to zero, d is equal to 1, e is equal to from about 50 to about 75 and f is equal to from about 10 to about 75.

16. The soft and flexible contact lens according to claim 15 wherein Z$_1$, Z$_2$, Z$_5$, Z$_6$, Z$_7$, Y$_1$ and Y$_2$ equal methyl, and Z$_4$ equals hydrogen, and at least one of the Z$_3$'s in the methylene bridge is equal

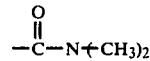

and the other Z$_3$'s in that bridge equal hydrogen, and X equals

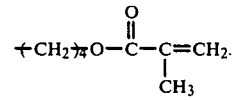

* * * * *

UNITED STATES PATENT AND TRADEMARK OFFICE
CERTIFICATE OF CORRECTION

PATENT NO. : 4,259,467
DATED : March 31, 1981
INVENTOR(S) : Philip L. Keogh et al It is certified that error appears in the above-identified patent and that said Letters Patent are hereby corrected as shown below:

| | |
|---|---|
| Col. 3, line 25, | delete the first word "then" and insert ---them---. |
| Col. 3, line 57, | delete the last word "ploymerized" and insert ---polymerized---. |
| Col. 4, line 38, | delete the fourth word "is" and insert ---if---. |
| Col. 4, line 42, | delete the first word "ether" and insert ---either---. |
| Col. 5, line 63, | delete the first word "boyd" and insert ---body---. |
| Col. 7, line 45, | delete the first word "Notthing" and insert ---Nothing---. |
| Col. 8, line 63, | delete the next-to-last word "craboxylic" and insert ---carboxylic---. |
| Col. 10, line 5, | delete the third word "methlpyridine" and insert ---methylpyridine---. |
| Col. 12, line 58, | after the figure 2, insert the letter ---d---. |
| Col. 25, line 22, | delete the second and third words from the end "here in" and insert ---herein---. |
| Col. 25, line 30, | delete the first word "sued" and insert ---used---. |

UNITED STATES PATENT AND TRADEMARK OFFICE
CERTIFICATE OF CORRECTION

PATENT NO. : 4,259,467
DATED : March 31, 1981
INVENTOR(S) : Philip L. Keogh et al It is certified that error appears in the above-identified patent and that said Letters Patent are hereby corrected as shown below:

Col. 28, delete the third chemical formula from the top

"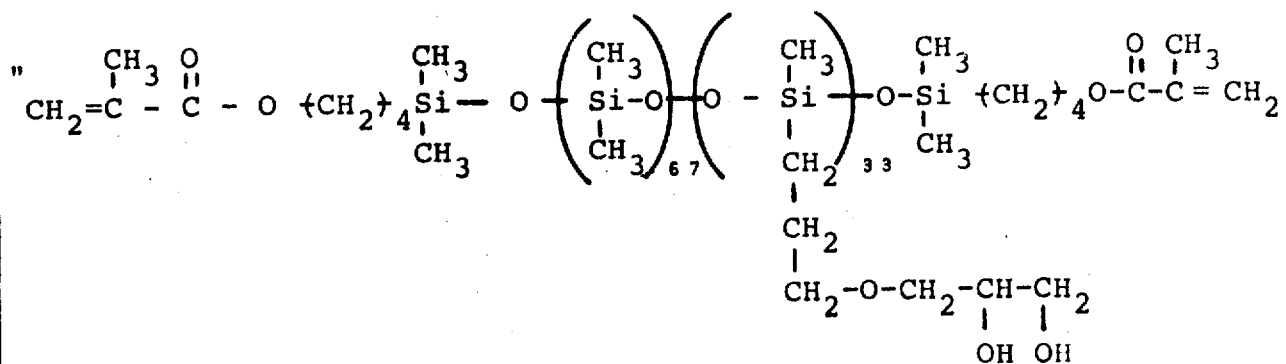

and insert ---

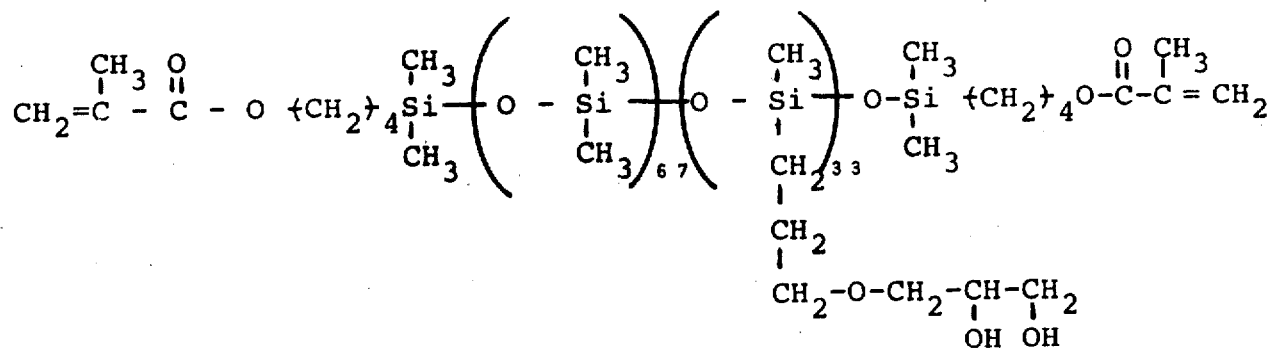

---.

UNITED STATES PATENT AND TRADEMARK OFFICE
CERTIFICATE OF CORRECTION

PATENT NO. : 4,259,467
DATED : March 31, 1981
INVENTOR(S) : Philip L. Keogh et al Page 3 of 8

It is certified that error appears in the above-identified patent and that said Letters Patent are hereby corrected as shown below:

Col. 29, line 1, delete the word "copolymer" and insert ---copolymers---.

Col. 30, lines 38-44, delete chemical formula

" 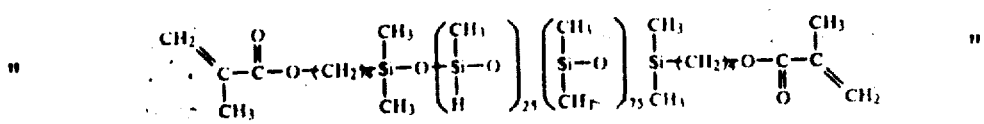 "

and insert

--- 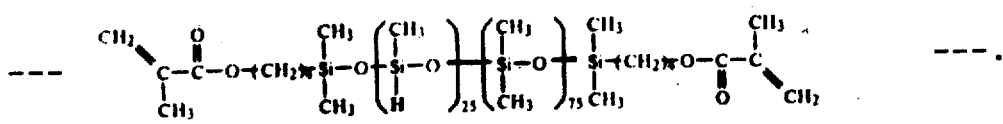 ---.

UNITED STATES PATENT AND TRADEMARK OFFICE
CERTIFICATE OF CORRECTION

PATENT NO. : 4,259,467
DATED : March 31, 1981
INVENTOR(S) : Philip L. Keogh et al It is certified that error appears in the above-identified patent and that said Letters Patent are hereby corrected as shown below:

Col. 31, lines 1-10, delete formula shown therein

" 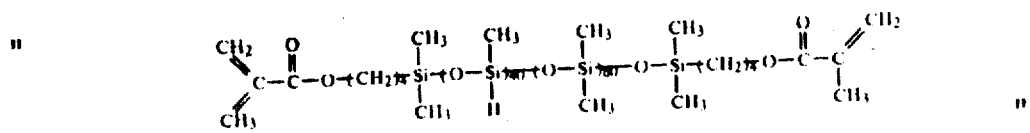 "

and insert

--- 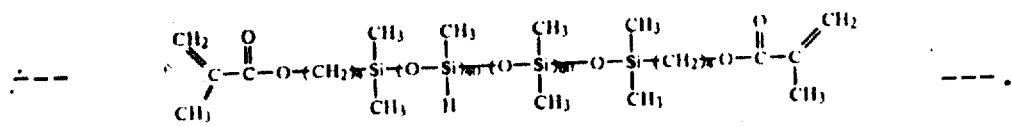 ---.

UNITED STATES PATENT AND TRADEMARK OFFICE
CERTIFICATE OF CORRECTION

PATENT NO. : 4,259,467
DATED : March 31, 1981
INVENTOR(S) : Philip L. Keogh et al It is certified that error appears in the above-identified patent and that said Letters Patent are hereby corrected as shown below:

Col. 34, lines 54-64, delete the formula as shown

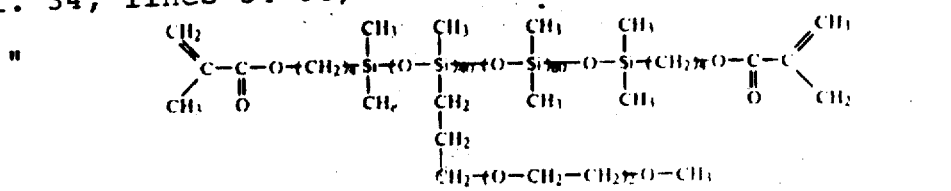

and insert

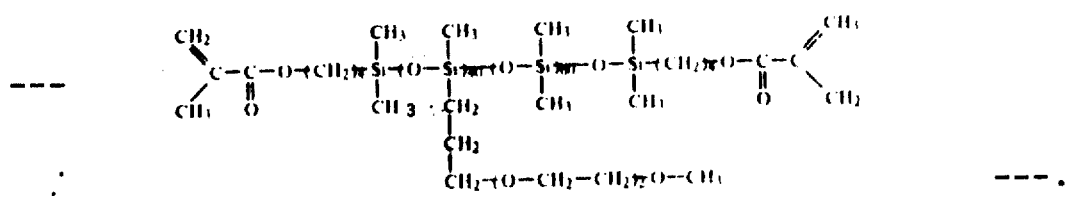

Col. 37, lines 54-59, delete the statement for calculating percent water as shown Percent Water = Wet Weight - Dry Weight/Wet Weight · 100 and insert

--- Percent Water = $\dfrac{\text{Wet Weight} - \text{Dry Weight}}{\text{Wet Weight}} \times 100$ ---.

UNITED STATES PATENT AND TRADEMARK OFFICE
CERTIFICATE OF CORRECTION

PATENT NO. : 4,259,467
DATED : March 31, 1981
INVENTOR(S) : Philip L. Keogh et al It is certified that error appears in the above-identified patent and that said Letters Patent are hereby corrected as shown below:

Col. 46, lines 41-51, delete the formula as shown

"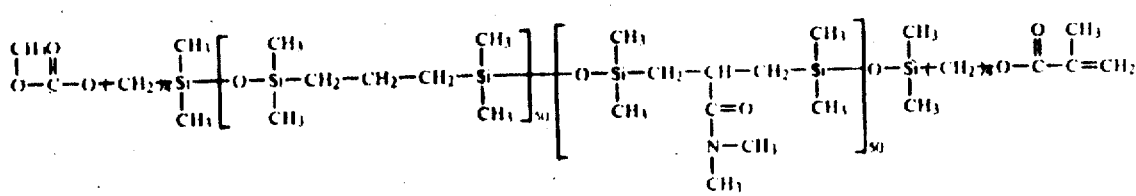"

and insert

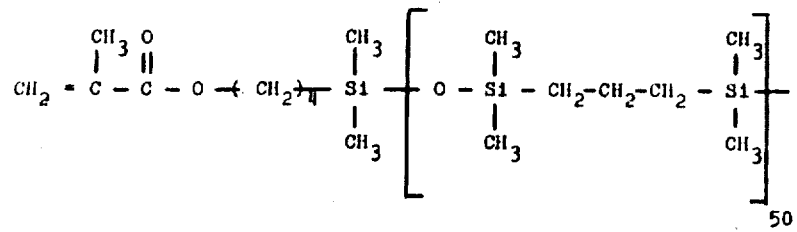

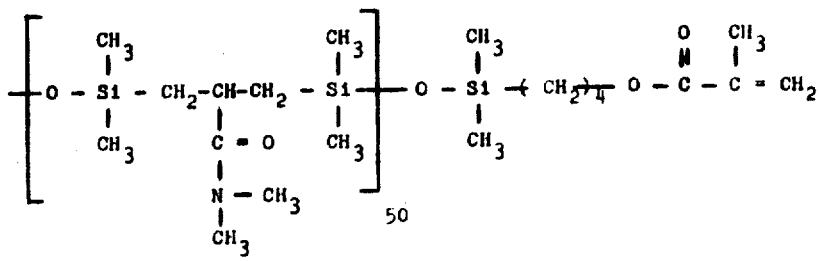

---.

UNITED STATES PATENT AND TRADEMARK OFFICE
CERTIFICATE OF CORRECTION

PATENT NO. : 4,259,467
DATED : March 31, 1981
INVENTOR(S) : Philip L. Keogh et al It is certified that error appears in the above-identified patent and that said Letters Patent are hereby corrected as shown below:

Col. 50, line 15, delete the formula as shown which is part of Claim 1

"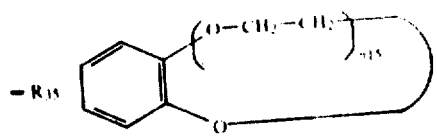 (11)"

and insert

--- 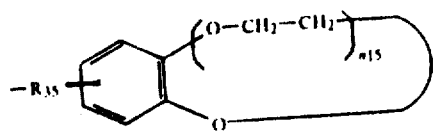 (11) ---.

Col. 50, line 25, delete the incorrect formula which is a portion of Claim 1

" 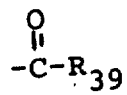 "

and insert

--- 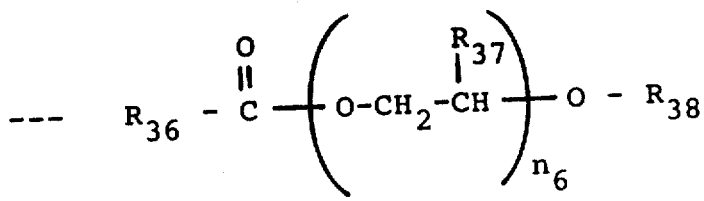 (12) ---.

UNITED STATES PATENT AND TRADEMARK OFFICE
CERTIFICATE OF CORRECTION

PATENT NO. : 4,259,467
DATED : March 31, 1981
INVENTOR(S) : Philip L. Keogh et al              Page 8 of 8

It is certified that error appears in the above-identified patent and that said Letters Patent are hereby corrected as shown below:

Column 54, lines 5 to 10, the formulae should appear as shown below:

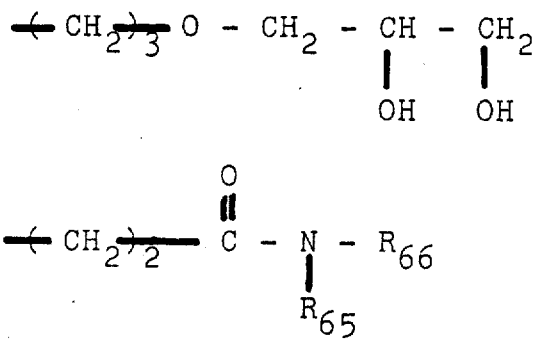

Signed and Sealed this

Seventh Day of July 1981

[SEAL]

Attest:

RENE D. TEGTMEYER

Attesting Officer            Acting Commissioner of Patents and Trademarks